(12) United States Patent
Shindoh

(10) Patent No.: US 7,301,653 B2
(45) Date of Patent: Nov. 27, 2007

(54) IMAGE PROCESSING APPARATUS, IMAGE PROCESSING METHOD, AND STORAGE MEDIUM

(75) Inventor: Hidenori Shindoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 887 days.

(21) Appl. No.: 10/742,824

(22) Filed: Dec. 23, 2003

(65) Prior Publication Data

US 2004/0190037 A1    Sep. 30, 2004

(30) Foreign Application Priority Data

Dec. 25, 2002  (JP)  ............................. 2002-374373
Dec. 17, 2003  (JP)  ............................. 2003-419119

(51) Int. Cl.
*G06F 15/00*  (2006.01)
*H04N 1/00*   (2006.01)

(52) U.S. Cl. .................... 358/1.13; 358/401; 358/1.15; 358/1.16

(58) Field of Classification Search ............... 358/1.13, 358/1.15, 1.16, 1.17, 401, 403, 404, 442
See application file for complete search history.

(56) References Cited

U.S. PATENT DOCUMENTS 4,998,215 A * 3/1991 Black et al. ................. 358/1.6
5,075,874 A * 12/1991 Steeves et al. ............. 358/1.13
5,526,469 A *  6/1996 Brindle et al. ............... 358/1.9
6,285,461 B1 *  9/2001 Fujii et al. ................... 358/1.18
2002/0051204 A1 * 5/2002 Ohara ........................ 358/1.16

FOREIGN PATENT DOCUMENTS

JP    2001-096854    4/2001

OTHER PUBLICATIONS

U.S. Appl. No. 10/665,536, filed Sep. 22, 2003, Motoyama.
U.S. Appl. No. 10/928,481, filed Aug. 30, 2004, Hattori, et al.

* cited by examiner

*Primary Examiner*—Thomas D. Lee
(74) *Attorney, Agent, or Firm*—Oblon, Spivak, McClelland, Maier & Neustadt, P.C.

(57) ABSTRACT

An image processing apparatus includes: an input part inputting image data; a storage part storing the input image data; an output part outputting the stored image data; a conversion part performing conversion on the output image data so that the data format thereof is converted to be suitable for the image output part; an SRC reservation part reserving, in the storage part, an SRC region of a capacity for storing the image data to be subjected to the conversion; a DST reservation part reserving, in the storage part, a DST region for storing the image data of the capacity after the conversion; a region division part dividing at least one of the SRC and DST regions into a plurality of regions; a first storing part storing the input image data in the SRC region; and a second storing part storing the image data after the conversion in the DST region.

10 Claims, 23 Drawing Sheets

SRC REGION    DST REGION

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium storing a program for causing a computer to execute the image processing method.

2. Description of the Related Art

Some image processing apparatuses include: an image input part that reads the image of an original or captures an image, and inputs the read or captured image; a semiconductor memory storing image data that is a digital signal to which the input image is converted; a large-capacity storage device storing the same image data, such as a hard disk drive; and an ASIC (application specific integrated circuit) (hereinafter referred to as a media link board or MLB) that performs image conversion (image compression). A monochrome image or color images such as a CMYK image or an RGB image are stored in the semiconductor memory and the storage device.

Such image processing apparatuses may include an image forming part that forms an image based on the image data stored in the large-capacity storage device. Image processing apparatuses having the image forming part include copiers, facsimile machines, and printers. In this case, the image data input by the image input part is stored by a method suitable for the image output method of an image output part.

The image output method of the image output part may differ, however, depending on the purpose of use, such as copying, facsimile, or printing. In this case, even if the same image data is input by the image input part, the method of storing the image data may differ depending on the image output method of the image output part. As a result, image data stored by a method suitable for an image output part may not be usable in another image output part having a different image output method, thus reducing the versatility of the image data.

In the case of converting image data input from the image input part using hardware such as the MLB, it is necessary to establish synchronization between processing on the software side that is the control side and processing on the hardware side where the image data is actually converted. Therefore, when such simple control is performed that the hardware and the software are alternately controlled, the software side has to wait for the completion of the conversion on the hardware side while the conversion is being performed on the hardware side. On the other hand, while the software side is performing the control operation, the hardware side has to wait for the completion of image preparation by the control operation on the software side. Accordingly, a waiting period is generated in both software and hardware sides.

Japanese Laid-Open Patent Application No. 2001-96854, for instance, teaches a technique to counter this problem. According to this technique, two buffer groups each made up of input and output buffers to which the same type of access occurs in units of processing such as bands are formed. The two buffer groups perform processing simultaneously so that each of the buffer groups can perform only one of data reading and data writing at a time and when one of the buffer groups performs data reading, the other one of the buffer groups performs data writing. Further, a data bus is divided into a portion dedicated to data writing and a portion dedicated to data reading so that each dedicated portion performs only one of data reading and data writing. This technique increases the efficiency of data transfer and the efficiency of bus usage between a memory and each of an expansion processing device and an input/output device, thus improving processing throughput and making it possible to perform high-speed processing.

Recent progress in technologies, such as improvements in transfer rate in data transfer and in data compression and processing rates in data compression using secondary storage such as a hard disk, is remarkable. Further, the image input/output parts in image processing apparatuses have come in an extremely wide variety. Therefore, it has become difficult to make the most of the capabilities of storage devices and data compression parts and secure productivity by conventional memory control.

SUMMARY OF THE INVENTION

Accordingly, it is a general object of the present invention to provide an image processing apparatus and method in which the above-described disadvantage is eliminated.

A more specific object of the present invention is to provide an image processing apparatus and method that make effective use of the resources of a storage part storing image data and secure productivity, and a storage medium storing a program for causing a computer to execute such an image processing method.

The above objects of the present invention are achieved by an image processing apparatus, including: an image input part inputting image data; an image storage part capable of storing the input image data; an image output part outputting the image data stored in the image storage part; a data format conversion part performing conversion on the image data output by the image output part so that a data format of the image data is converted to a data format suitable for the image output part; an SRC region reservation part reserving an SRC region of a capacity in the image storage part, the SRC region storing the image data to be subjected to the conversion by the data format conversion part; a DST region reservation part reserving a DST region in the image storage part, the DST region storing the image data of the capacity after the conversion; a region division part dividing at least one of the SRC and DST regions into a plurality of regions; a first storing part storing the input image data in the SRC region; and a second storing part storing the image data after the conversion in the DST region.

The above objects of the present invention are also achieved by an image processing method, including the steps of: (a) performing conversion on image data output from an image storage part by an image output part so that a data format of the image data is converted to a data format suitable for the image output part, the image data being input by an image input part and stored in the image storage part; (b) reserving an SRC region of a capacity in the image storage part, the SRC region storing the image data to be subjected to the conversion by the step (a); (c) reserving a DST region in the image storage part, the DST region storing the image data of the capacity after the conversion; (d) dividing at least one of the SRC and DST regions into a plurality of regions; (e) storing the input image data in the SRC region; and (f) storing the image data after the conversion in the DST region.

The above objects of the present invention are further achieved by a computer-readable recording medium storing a program for causing a computer to execute an image processing method, the computer including an image input part inputting image data, an image storage part capable of storing the input image data, and an image output part outputting the image data stored in the image storage part, the image processing method including the steps of: (a) performing conversion on the image data output by the image output part so that a data format of the image data is converted to a data format suitable for the image output part; (b) reserving an SRC region of a capacity in the image storage part, the SRC region storing the image data to be subjected to the conversion by the step (a); (c) reserving a DST region in the image storage part, the DST region storing the image data of the capacity after the conversion; (d) dividing at least one of the SRC and DST regions into a plurality of regions; (e) storing the input image data in the SRC region; and (f) storing the image data after the conversion in the DST region.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of an embodiment of the present invention. In this embodiment, the present invention is applied to a digital copier as an image processing apparatus.

Figure 1:
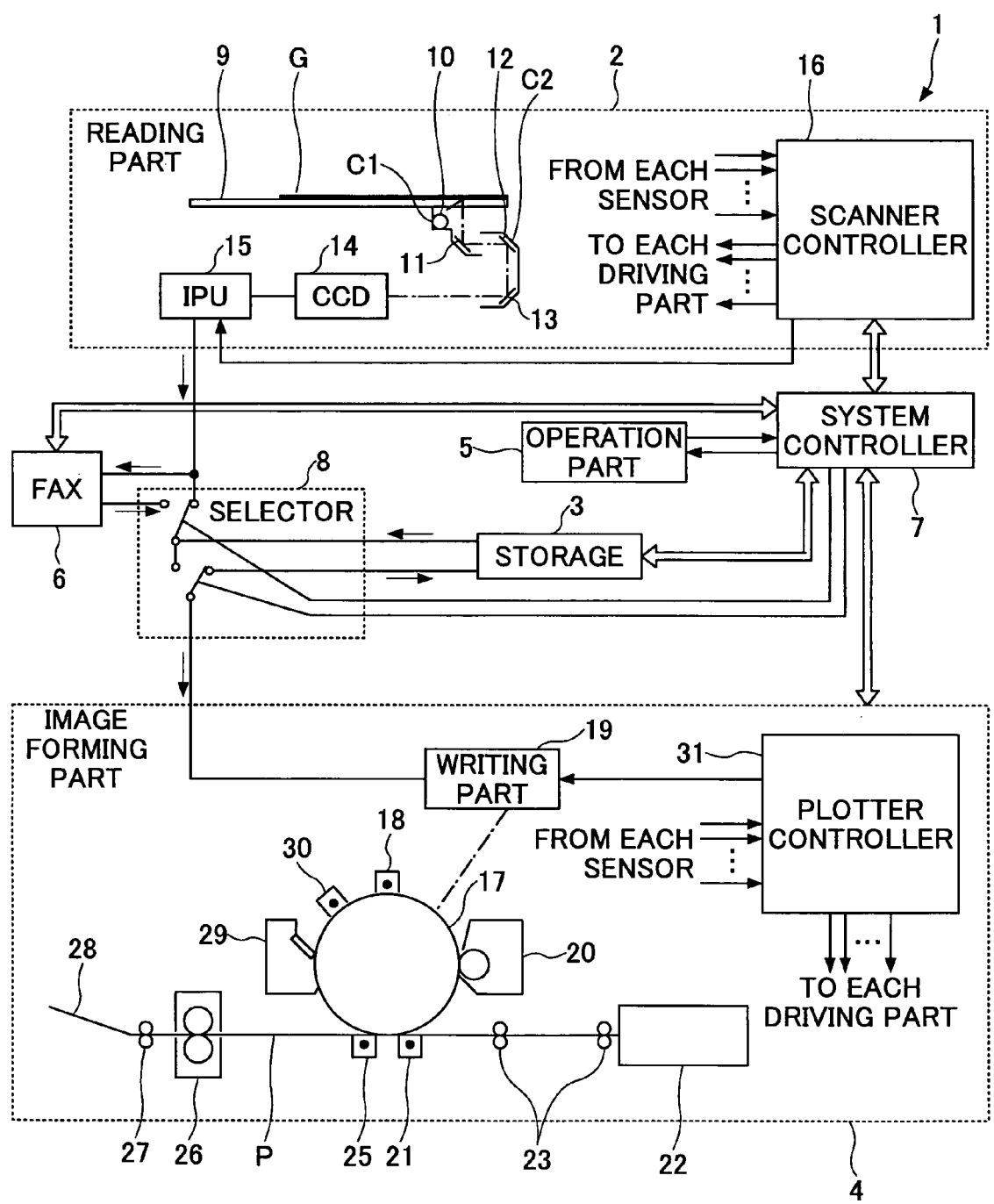
FIG. 1 is a schematic block diagram showing a digital copier according to an embodiment of the present invention.

FIG. 1 is a schematic block diagram showing a digital copier 1 according to the embodiment of the present invention. The digital copier 1 includes a reading part as an image input part, a storage part 3, an image forming part 4, an operation part 5, and a FAX part 6. The reading part 2 optically reads the image of an original. The storage part 3 stores image data based on the image read by the reading part 2. The image forming part 4 performs image formation on the basis of the image data based on the image read by the reading part 2. The operation part 5 receives an operation by an operator. The FAX part 6 transmits data to and receives data from an external apparatus (not graphically represented). According to this embodiment, the image forming part 4 and the FAX part 6 realizes the image output part of the image processing apparatus.

According to this embodiment, the image input part is realized by the reading part 2. Alternatively, the image input part may also be realized by a digital camera. A graphical representation and description of the digital camera, which is a well known technology, is omitted.

Further, according to this embodiment, the image forming part 4 and the FAX part 6 realize the image output part. On the other hand, in the mode where a personal computer (PC) on a network is connected via an I/F to the digital copier 1 so as to freely perform communications therewith and the image data read by the reading part 2 is transferred to the PC, an interface that transfers the image data to the PC also functions as the image output part. In this case, the I/F that performs data communications with the PC connected to the network realizes the access control part and the access control function of the digital copier 1.

Each of the reading part 2, the storage part 3, the image forming part 4, the operation part 5, and the FAX part 6 is driven and controlled by a system controller 7 connected to each of the parts 2 through 6 so as to freely perform communications therewith. The system controller 7 performs communications with each of the parts 2 through 6, thereby setting parameters in each of the parts 2 through 6 for the operations thereof.

A description is given next of the operation part 5. The operation part 5 receives an operation by an operator, and functions as an interface to the operator. The operation part 5 includes various operation keys and a display part formed of a liquid crystal display (LCD), which are not graphically represented in particular. The state of the entire digital copier 1, for instance, is displayed on the display part by the control of the system controller 7. When any of the operation keys is operated by the operator, the operation part 5 transmits a signal corresponding to the operated key to the system controller 7.

The digital copier 1 further includes a selector part 8. The selector part 8 is driven and controlled by the system controller 7 to change the state of connection so that the source of image data based on which an image is to be formed is selected from the reading part 2, the storage part 3, and the FAX part 6.

Figure 2:
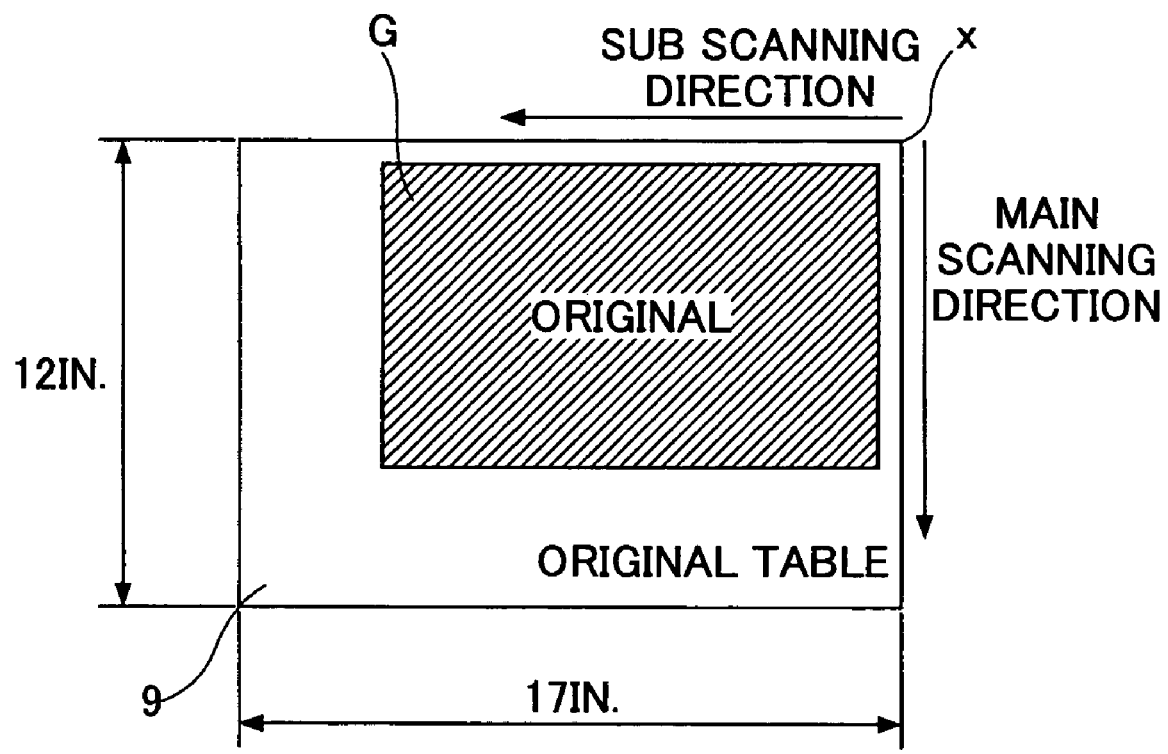
FIG. 2 is a top plan view of an original table of the digital copier according to the embodiment of the present invention.

A description is given next of the reading part 2 together with a reading process therein. The reading part 2 includes an exposure lamp 10 exposing an original G placed on an original table 9 to light, and reflecting mirrors 11, 12, and 13 reflecting reflected light from the original toward a charge-coupled device (CCD) image sensor (hereinafter, CCD) 14. The exposure lamp 10 and the reflecting mirrors 11, 12, and 13 are provided to running bodies C1 and C2 that can run freely in the sub scanning direction along the original table 9. The image of the original G is scanned and exposed to light by causing the running bodies C1 and C2 to run along the original table 9 by a driving motor (not graphically represented) while causing the exposure lamp to emit light. FIG. 2 is a top plan view of the original table 9. The original G is placed on the original table 9 so that a corner of the original G is fitted to a reference corner X (an upper right corner in FIG. 2) of the original table 9.

The reader part 2 includes the CCD 14 to which light reflected from the original G and reflected by the reflecting mirrors 11 through 13 is input. The light reflected from the original G is condensed by a lens (not graphically represented) and input to the CCD 14. The CCD 14 performs photoelectric conversion on the input light. The CCD 14 generates an electrical signal according to the intensity of the input light, and outputs the electrical signal as analog image data to an image processing unit (IPU) 15. The IPU 15 performs processing such as shading correction on the analog image data, and thereafter, performs analog-to-digital (A/D) conversion on the analog image data, thereby generating 8-bit digital image data (hereinafter, image data). Further, the IPU 15 performs image processing such as scaling and dithering on the image data, and thereafter, outputs the image data together with an image synchronization signal to the image forming part 4. According to this embodiment, the reading process in the reading part 2 includes the above-described operations.

The reading part 2 further includes a scanner controller 16. The scanner controller 16 drives and controls the driving motor (not graphically represented) and various sensors (not graphically represented) that detect the size of the original G placed on the original table 9 and the state of operation of each part of the reading part 2. The scanner controller 16 detects the outputs of the sensors, and drives and controls the driving motor in order to perform the above-described reading process. Further, the scanner controller 16 sets in the IPU 15 various parameters that are referred to in the reading process.

Figure 3:
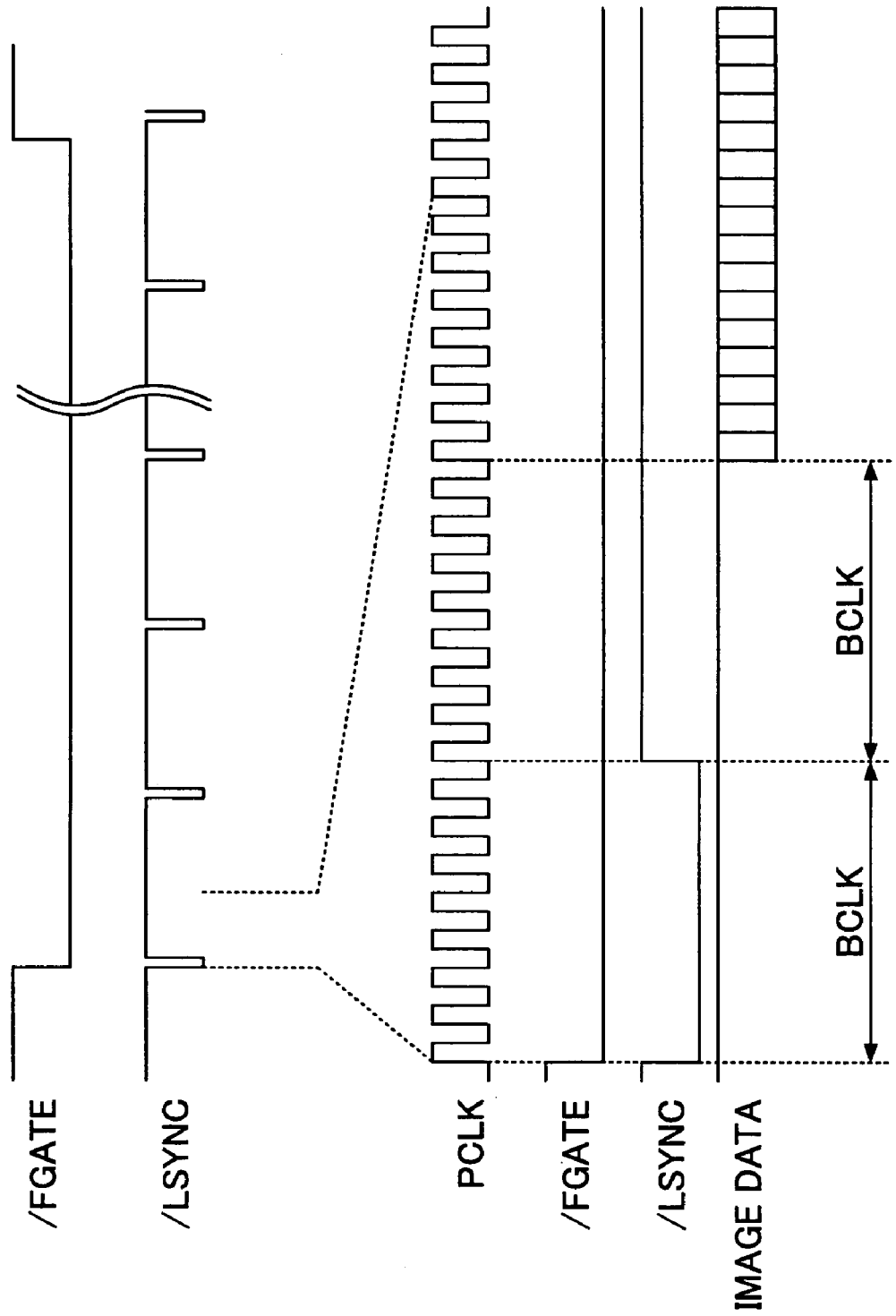
FIG. 3 is a timing chart for illustrating an image synchronization signal output from an IPU of a reading part of the digital copier according to the embodiment of the present invention.

A description is given next, with reference to FIG. 3, of the image synchronization signal output from the IPU 15 of the reading part 2. Referring to FIG. 3, a frame gate signal (/FGATE) represents the effective range of an image with respect to an image area in the sub scanning direction. The image data output from the IPU 15 is validated while the frame gate signal (/FGATE) is at LOW level (low active). The frame gate signal (/FGATE) is asserted or negated at a falling edge of a line synchronization signal (/LSYNC).

The line synchronization signal (/LSYNC) is asserted at a rising edge of a pixel synchronization signal (PCLK) for a predetermined number of clock pulses. According to this embodiment, the image data in the main scanning direction is validated after the predetermined number of clock pulses after the rising edge of the pixel synchronization signal (PCLK). One item of the image data is transmitted per cycle of the pixel synchronization signal (PCLK). According to this embodiment, the image data is transmitted, divided into portions each corresponding to 400 dpi letting the reference corner X shown in FIG. 2 be a starting point. Further, according to this embodiment, the image data is transmitted as raster format data starting from the reference corner X shown in FIG. 2. Normally, the effective range of the image data in the sub scanning direction is determined by the size of transfer paper.

The image data of the original G output by the IPU 15 is stored in the storage part 3. As a result, the image of the original G read by the reading part 2 can be used in a copy application that performs a "repeat copy" function or a "rotate copy" function. Further, the storage part 3 also functions as a buffer memory that temporarily stores binary image data from the FAX part 6. The FAX part 6 is controlled by the system controller 7 to perform binary compression on the image data output from the IPU 15 or the storage part 3 based on a facsimile data transmission standard such as G3 or G4 and transfer the image data to a telephone line. Further, the FAX part 6 restores image data transferred from an external apparatus via the telephone line to binary image data, and outputs the binary image data to a writing part 19 of the image forming part 4.

A description is given next of the image forming part 4 together with an image forming process therein. The image forming part 4 includes a photosensitive body 17, a charger 18, and the writing part 19. The photosensitive body 17 rotates at a constant rate. The charger 18 evenly charges the surface of the photosensitive body 17. The writing part 19 emits light to the surface of the photosensitive body 17, the light being modulated based on the image data output from the IPU 15 of the reading part 2. The surface of the photosensitive body 17 charged evenly by the charger 18 is exposed to light and scanned by the writing part 19 so that an electrostatic latent image according to the image data is formed on the surface of the photosensitive body 17.

The image forming part 4 further includes a developing unit 20 and a transfer charger 21. The developing unit 20 forms a toner image on the surface of the photosensitive body 17 by supplying toner to the electrostatic latent image on the surface of the photosensitive body 17. The transfer charger 21 electrostatically transfers the toner image formed on the surface of the photosensitive body 17 to a recording medium such as transfer paper. Sheets of transfer paper stacked and held in a paper feed tray 22 are employed as recording media, and the transfer charger 21 transfers the toner image formed on the surface of the photosensitive body 17 to a sheet of transfer paper.

When the image forming process is performed, a sheet of transfer paper to which the toner image is to be transferred is fed from the paper feed tray 22 into a conveying path P by paper feed rollers 23. Then, the sheet of transfer paper is conveyed by a registration roller (not graphically represented) to a transfer position with timing adjusted to the timing of toner image transfer by the transfer charger 21.

The image forming part 4 further includes a separation charger 25 and a fixing unit 26. The separation charger 25 separates from the surface of the photosensitive body 17 the sheet of transfer paper to which the toner image has been transferred by the transfer charger 21. The fixing unit 26 fixes the toner on the sheet of transfer paper to which the toner image has been transferred by heating the sheet of transfer paper. The sheet of transfer paper on which the toner has been fixed by the fixing unit 26 is ejected onto a paper ejection tray 28 through paper ejection rollers 27.

The image forming part 4 further includes a cleaning unit 29 and a discharging charger 30. The cleaning unit 29 removes toner remaining on the surface of the photosensitive body 17 after the electrostatic transfer. The discharging charger 30 removes charging electricity remaining on the photosensitive body 17 after the electrostatic transfer. The cleaning unit 29 cleans and the discharging charger 30 discharges the surface of the photosensitive body 17 after the sheet of transfer paper is separated therefrom. According to this embodiment, the cleaning unit 29 includes a press contact member pressed against the photosensitive body 17. According to this embodiment, the image forming process in the image forming part 4 includes the above-described operations.

The image forming part 4 further includes a plotter controller 31. The plotter controller 31 drives and controls each part of the image forming part 4. For instance, the image forming part 4 drives and controls various sensors (not graphically represented) each detecting the state of operation of the corresponding part of the image forming part 4 and a motor (not graphically represented) driving and controlling the photosensitive body 17. The image forming part 4 detects the outputs of the sensors, and drives and controls the motor in order to perform the above-described image forming process.

Figure 4:
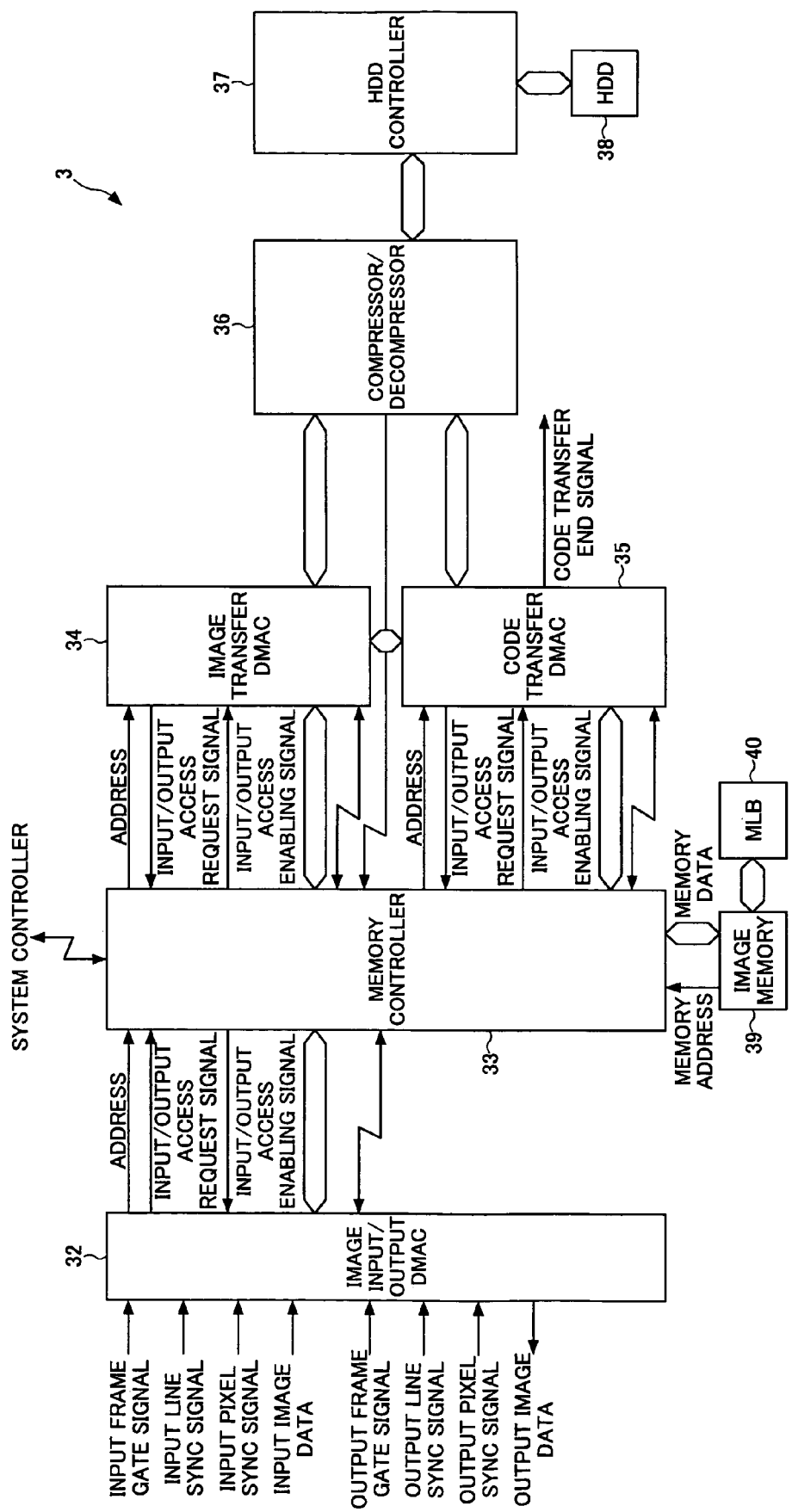
FIG. 4 is a block diagram showing a storage part of the digital copier according to the embodiment of the present invention.

A description is given next, with reference to FIG. 4, of the storage part 3. The storage part 3 includes an image input/output DMAC (direct memory access controller) 32, a memory controller 33, an image transfer DMAC 34, a code transfer DMAC 35, a compressor/decompressor 36, an HDD (hard disk drive) controller 37, an HDD 38, an image memory 39, and an MLB 40 realizing a data format conversion part and a data format conversion function. The image memory 39 is an image storage part, and the HDD 38 is another image storage part.

The memory controller 33 is composed of logics and a CPU (not graphically represented) connected to memory such as a ROM and a RAM. The memory of the memory controller 33 stores an image processing program for obtaining and freeing a source (SRC) region and a destination (DST) region in the storage part 3, which is described below. Therefore, according to this embodiment, the memory of the memory control part 33 realizes a storage medium according to the present invention.

The image processing program is recorded on a portable medium so as to be readable by a computer, and is read out from the portable medium by a medium information reader (not graphically represented) to be stored in the memory of the memory controller 33. Accordingly, the portable medium storing the image processing program also realizes the storage medium according to the present invention. The portable medium is selectable from a variety of recording media including an optical information storage medium such as a CD-ROM. The medium information reader is selected and set suitably in accordance with the type of the portable medium employed as the storage medium.

The memory controller 33, which can communicate freely with the system controller 7, receives commands through communications with the system controller 7, and performs operation setting in accordance with the received commands. Further, the memory controller 33 transmits status information to the system controller 7 in order to inform the system controller 7 of the status of the storage part 3.

The operation commands transmitted from the system controller 7 to the memory controller 33 include commands of image input, image output, compression, and decompression. When the command of image input or image output is transmitted from the system controller 7, the memory controller 33 drives and controls the image input/output DMAC 32. When a compression-related command is transmitted from the system controller 7, the memory controller 33 drives and controls the image transfer DMAC 34, the code transfer DMAC 35, or the compressor/decompressor 36.

The image input/output DMAC 32 is composed of a CPU and logics (not graphically represented), and can communicate freely with the memory controller 33. The image input/output DMAC 32 receives a command through the communication with the memory controller 33, and performs operation setting in accordance with the received command. Further, the image input/output DMAC 32 transmits status information to the memory controller 33 to inform the memory controller 33 of the status of the image input/output DMAC 32. In the case of receiving the command of image input, the image input/output DMAC 32 packs input image data into 8-pixel memory data as a unit in accordance with an input image synchronization signal, and outputs the image data together with a memory access request signal to the memory controller 33 as required. In the case of receiving the command of image output, the image input/output DMAC 32 outputs image data supplied from the memory controller 33 in synchronization with an output image synchronization signal.

The image transfer DMAC 34 is composed of a CPU and logics (not graphically represented), and can communicate freely with the memory controller 33. The image transfer DMAC 34 receives a command through the communication with the memory controller 33, and performs operation setting in accordance with the received command. Further, the image transfer DMAC 34 transmits status information to the memory controller 33 to inform the memory controller 33 of the status of the image transfer DMAC 34. In the case of receiving the command of compression, the image transfer DMAC 34 transmits a memory access request signal to the memory controller 33. Then, the image transfer DMAC 34 receives image data when a memory access enabling signal is active, and transfers the image data to the compressor/decompressor 36. Further, the image transfer DMAC 34 has a built-in address counter that counts up in accordance with the memory access request signal. In transmitting the image data to the compressor/decompressor 36, the image transfer DMAC 34 outputs thereto a 22-bit memory address indicating a storage location where the image data is stored.

The code transfer DMAC 35 is composed of a CPU and logics (not graphically represented), and can communicate freely with the memory controller 33. The code transfer DMAC 35 receives a command through the communication with the memory controller 33, and performs operation setting in accordance with the received command. Further, the code transfer DMAC 35 transmits status information to the memory controller 33 to inform the memory controller 33 of the status of the code transfer DMAC 35. When the memory controller 33 receives the command of decompression from the system controller 7, the code transfer DMAC 35 outputs a memory access request signal to the memory controller 33. Then, the code transfer DMAC 35 receives image data when a memory access enabling signal is active, and transfers the image data to the compressor/decompressor 36. Further, the code transfer DMAC 35 has a built-in address counter that counts up in accordance with the memory access request signal, and outputs a 22-bit memory address indicating a storage location where the image data is stored. A description is given later of the descriptor access operation of the code transfer DMAC 35.

The compressor/decompressor 36 is composed of a CPU and logics (not graphically represented), and can communicate freely with the memory controller 33. The compressor/decompressor 36 receives a command through the communication with the memory controller 33, and compresses or decompresses image data in accordance with the received command. According to the compression and decompression of image data by the compressor/decompressor 36, binary data is processed by MH (modified Huffman) coding. A description of MH coding of binary data is omitted. The compressor/decompressor 36 transmits status information to the memory controller 33 to inform the memory controller 33 of the status of the compressor/decompressor 36.

Figure 5:
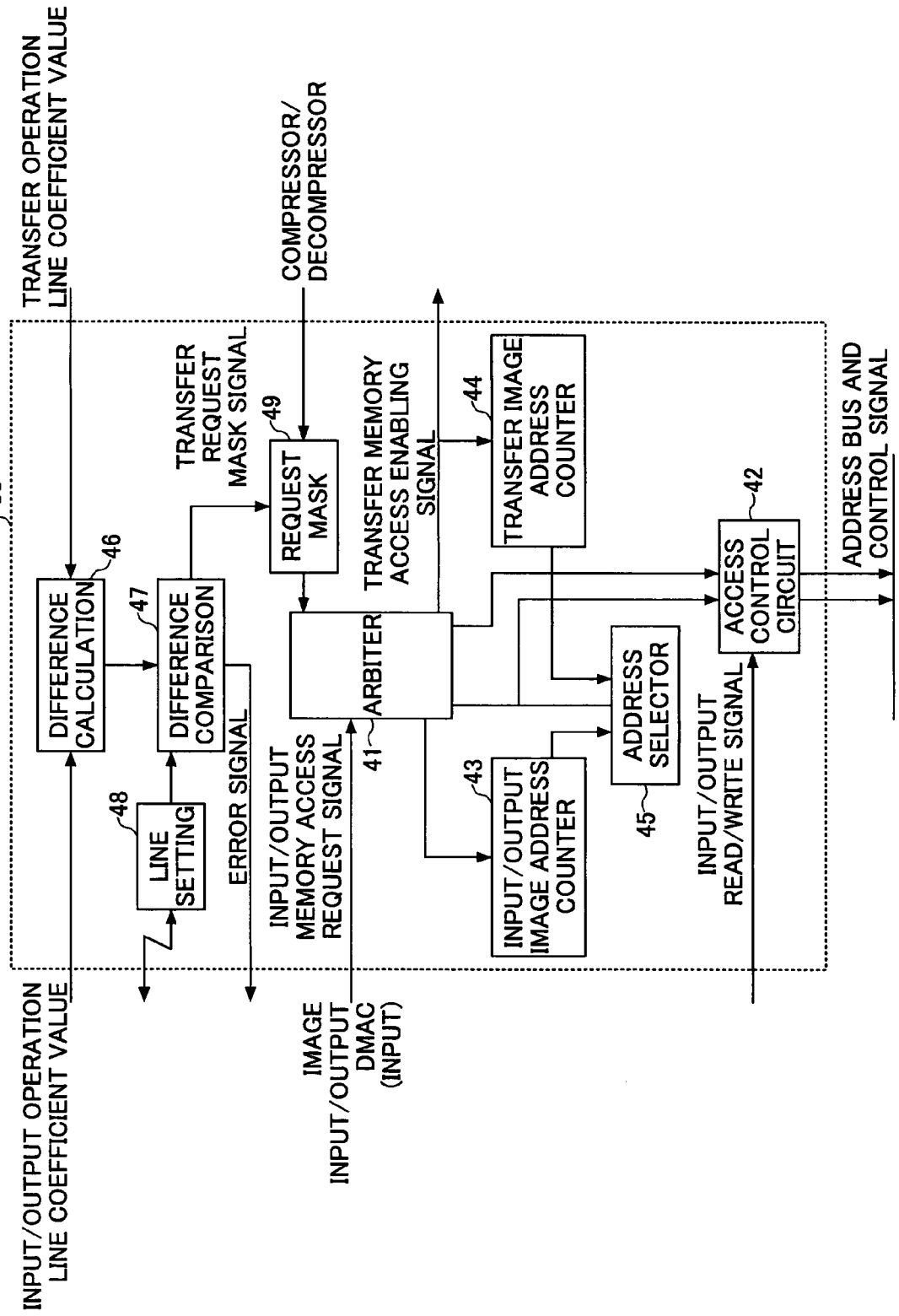
FIG. 5 is a block diagram showing a memory controller of the storage part according to the embodiment of the present invention.

A detailed description is given next, with reference to FIG. 5, of the memory controller 33. The memory controller 33 includes an arbiter 41. The arbiter 41 arbitrates among the memory access request signals supplied from the image input/output DMAC 32, the image transfer DMAC 34, and the code transfer DMAC 35, and outputs an access enabling signal to a predetermined authorized location. The arbiter 41 includes a refresh control circuit (not graphically represented), and outputs the memory access enabling signal in the active state to the authorized location in accordance with the order of priorities of refreshing, the image input/output DMAC 32, the image transfer DMAC 34, and the code transfer DMAC 35. The memory access enabling signal is output in the active state to the authorized location on the condition that memory access is inactive. The arbiter 41 outputs the memory access enabling signal in the active state to the authorized location, and at the same time, selects an address in the image memory 39 through an address selector 45 to output a trigger signal indicating the start of memory access to an access control circuit 42.

The address of image data whose input/output or transfer has been authorized by the arbiter 41 is counted by an input/output image address counter 43 or a transfer image address counter 44 and selected by the address selector 45.

The memory controller 33 further includes a difference calculation part 46, a difference comparison part 47, a line setting part 48, and a request mask 49, whose description is omitted.

According to this embodiment, a DRAM is employed for the image memory 39, thus requiring refreshing. Alternatively, an SRAM, which requires no refreshing, is employable, for instance. However, the manufacturing costs of an apparatus can be reduced by using a DRAM as in this embodiment.

The access control circuit 42 divides a physical address input to the memory controller 33 into a row address and a column address so as to correlate the physical address with the image memory 39 formed of a DRAM, which is a semiconductor memory, and outputs the physical address to an 11-bit address bus. Further, the access control circuit 42 outputs DRAM control signals (RAS, CAS, and WE) in accordance with the access start signal supplied from the arbiter 41.

As described above, the image memory 39 is composed of a semiconductor storage device such as a DRAM, and stores image data output from the IPU 15. The total storage capacity of the image memory 39 is 27 MB, which is the sum of 18 MB, equivalent to twice the size of A3-size binary image data at 600 dpi, and 9 MB of memory for data conversion (compression). In addition to the capacity of 27 MB, the image memory 39 has a storage capacity of 7 MB as memory dedicated to image conversion (compression). Image data is written to or read out from the image memory 39 by the control of the memory controller 33. The image memory 39 stores image data to be subjected to conversion by the MLB 40 (such image data may be referred to as Source or SRC) and image data converted by the MLB 40 (such image data may be referred to as Destination or DST). Therefore, according to this embodiment, the image memory 39 realizes a first storing part and a first storing function. Further, according to this embodiment, the image memory 39 realizes a second storing part and a second storing function.

The MLB 40 performs conversion on an image stored in the image memory 39, and is realized by an ASIC, for instance. The MLB 40 is composed of software and hardware. The software performs operations other than the conversion, such as preparation of image data to be subjected to the conversion by the MLB 40 in an SRC region in the image memory 39, transfer of image data to be stored in the HDD 38, and transfer of image data to the image forming part 4 and a network. The SRC region stores image data to be subjected to the conversion by the MLB 40. The hardware (including control software) performs basic operations such as conversion of the prepared image data (SRC) to a desired format and writing of the converted image data (DST) to a DST region in the image memory 39. The DST region is where image data after the conversion is written.

Figure 6:
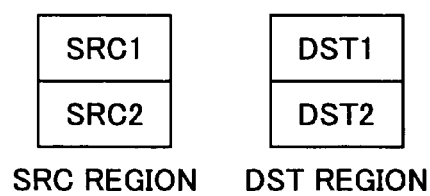
FIG. 6 is a diagram showing a memory structure according to the embodiment of the present invention.

When the MLB 40 performs image conversion control, the SRC region (input image region) and the DST region (output image region) are reserved in the image memory 39, which is an image storage part, as shown in FIG. 6. A detailed description is given later of the operation of obtaining the SRC and DST regions to be reserved in the image memory 39.

Further, when the MLB 40 performs the image conversion control, each of the SRC and DST regions is used as a ring buffer, and is divided into a predetermined number of buffer divisions (sub regions). Thus, the MLB 40 realizes a region division part and a region division function. Referring to FIG. 6, according to this embodiment, the SRC region is divided into two sub SRC regions of SRC1 and SRC2, and the DST region is divided into two sub DST regions of DST1 and DST2.

Figure 7:
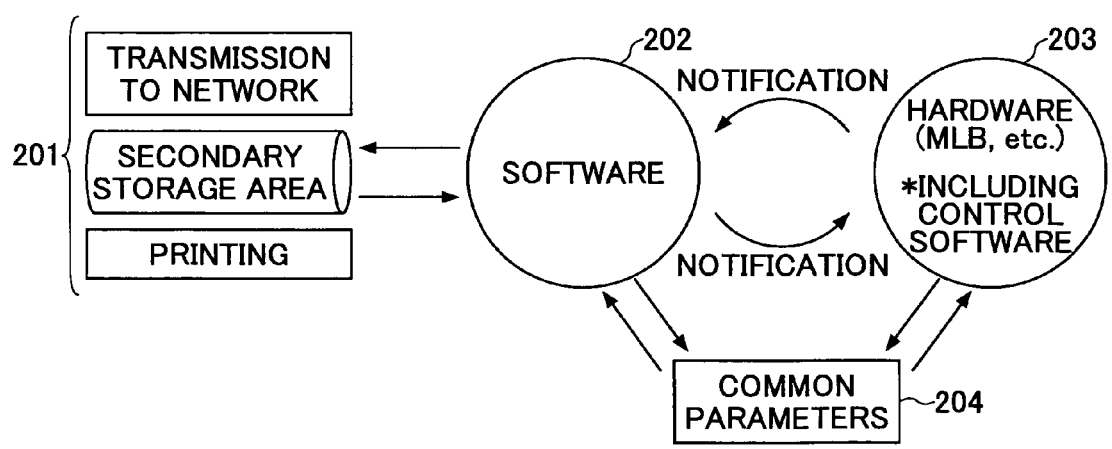
FIG. 7 is a diagram showing image conversion control by an MLB provided in the storage part according to the embodiment of the present invention.

FIG. 7 is a diagram showing the relationship among software 202, hardware 203, an input source/output destination 201, and common parameters 204. Referring to FIG. 7, the input source/output destination 201 includes a network to which data is transmitted, a secondary storage area on which reading and writing are performed, and an output of printing.

The software 202 and the hardware 203 exchange notifications. Further, the software 202 and the input source/output destination 201 communicate with each other. The software 202, for instance, may transmit image data to another apparatus via the network. Further, the software 202 may read data from and write data to the secondary storage area such as a hard disk. The software 202 may also print image data.

The common parameters 204 retain statuses representing the states of the software 202 and the hardware 203.

Figure 8:
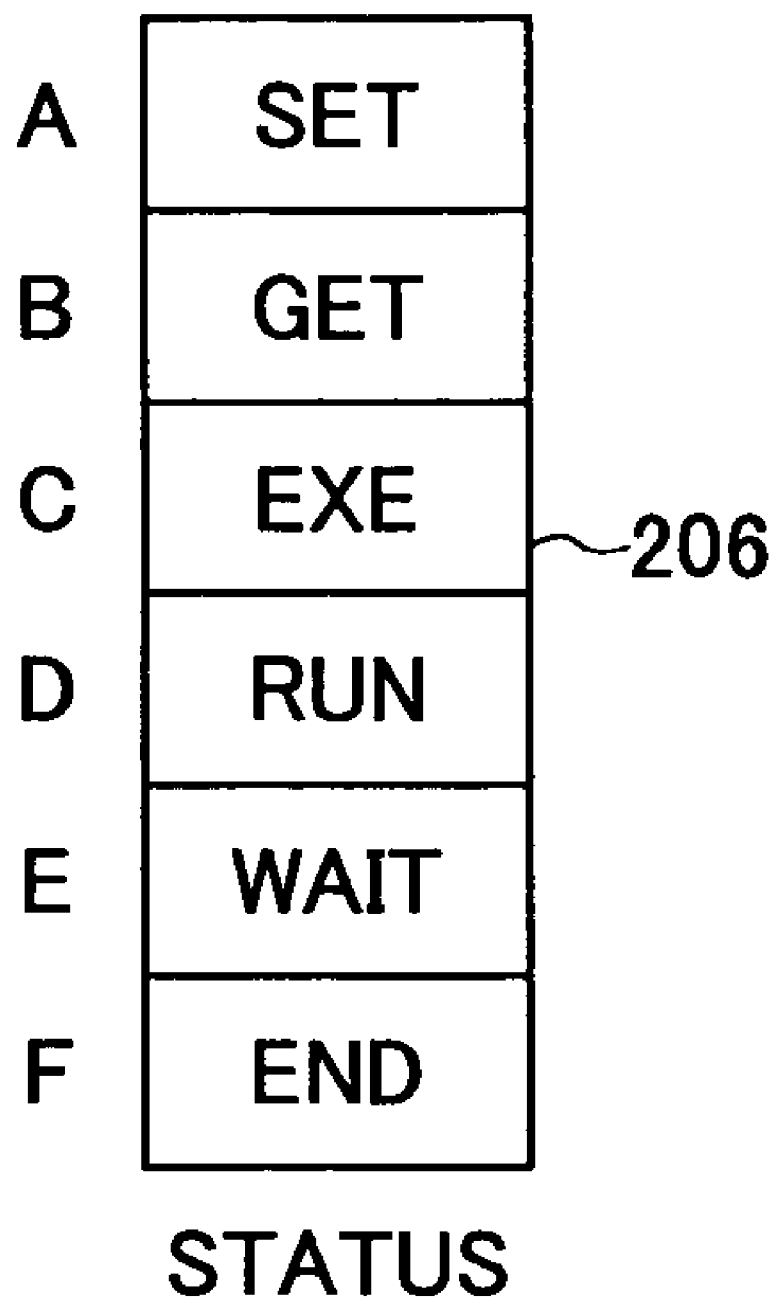
FIG. 8 is a diagram showing statuses representing the states of software and hardware of the MLB according to the embodiment of the present invention.

When the MLB 40 performs the image conversion control, the software 202 and the hardware 203 refer to a status representing each other's state. According to this embodiment, the statuses representing each other's states of the software 202 and the hardware 203 are six statuses 206 as shown in FIG. 8. The six statuses 206 are:

A: SET . . . the state of determining an operation necessary for processing to be executed;

B: GET . . . the state of obtaining a resource necessary for the processing to be executed;

C: EXE . . . the state of starting executing the processing;

D: RUN . . . the state of being executing the processing;

E: WAIT . . . the state of waiting for a response from the hardware side; and

F: END . . . the state of termination.

As described above, each of the software 202 and the hardware 203 has these statuses. By thus employing the statuses representing each other's states as the common parameters 204, the software 202 and the hardware 203 can refer to each other's processing result.

A description is given next of each table provided to the MLB 40. The MLB 40 includes an image ID table 50, a descriptor table 60, and a block table 70 employed in obtaining and freeing the SRC and DST regions in the image memory 39.

According to this embodiment, the image ID table 50, the descriptor table 60, and the block table 70 are provided to the MLB 40. Alternatively, these tables 50, 60, and 70 may be provided to the image memory 39.

Figure 9:
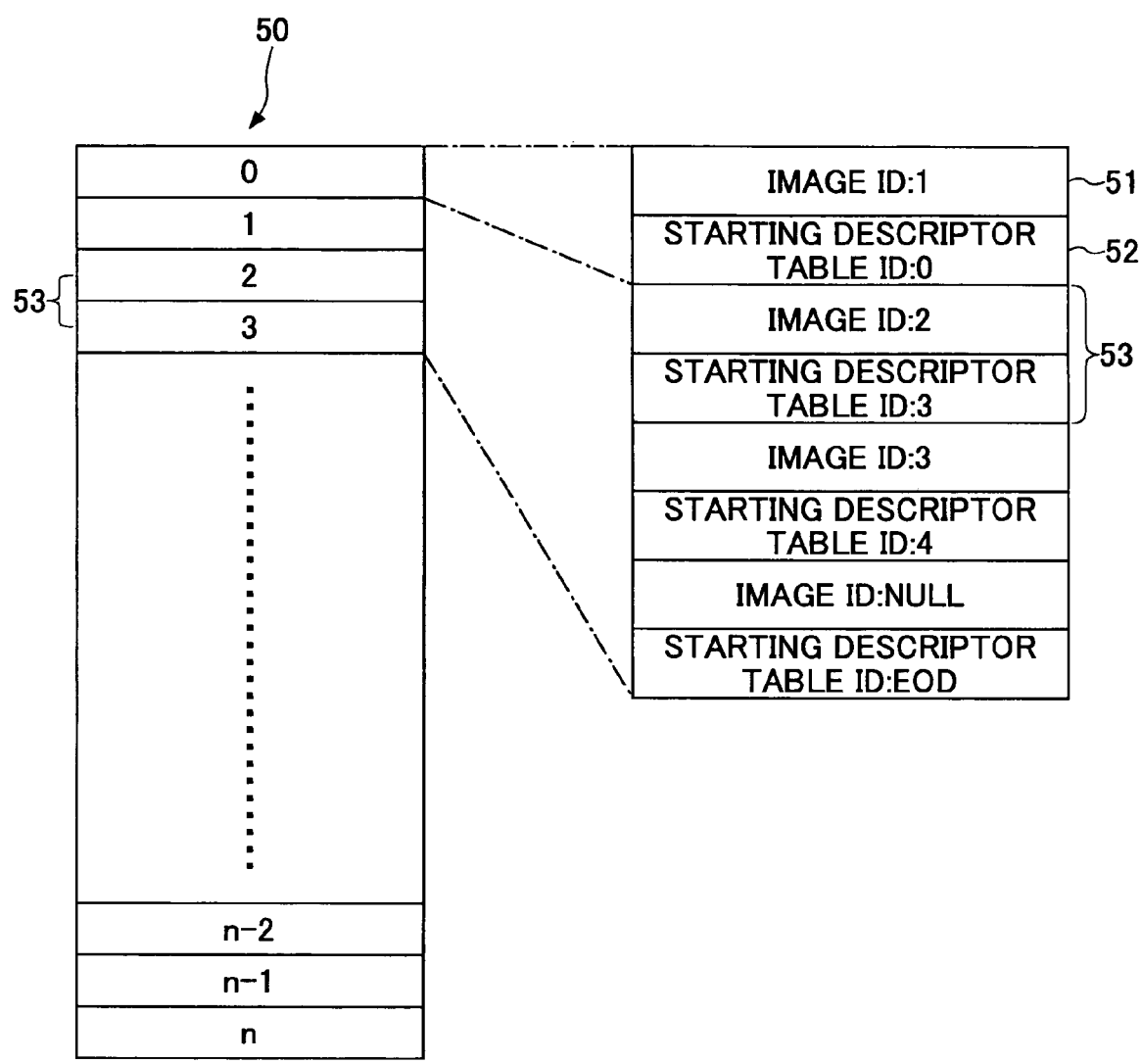
FIG. 9 shows an image ID table according to the embodiment of the present invention.

Referring to FIG. 9, the image ID table 50 includes a plurality of unit image ID tables 53 each formed of an image ID area 51 in which an image ID is set and a starting descriptor table ID area 52 in which a starting descriptor table ID is set.

The image ID set in the image ID area 51 is a unique ID that is common to the image memory 39, which is an image memory part, and the HDD 38, which is another image memory part. In each of the image memory 39 and the HDD 38, different images should be assigned different image IDs.

According to this embodiment, the image ID is prevented from employing 0 (NULL) as a system reservation ID so as to let 0 (NULL) be an initial state on the image ID area 51.

The starting descriptor table ID set in the starting descriptor table ID area 52 indicates a descriptor table ID that is obtained first.

In the initial state of the image ID table 50, NULL is set in the image ID area 51 and EOD (end of descriptor) is set in the starting descriptor table ID area 52 in each unit image ID table 53.

Figure 10:
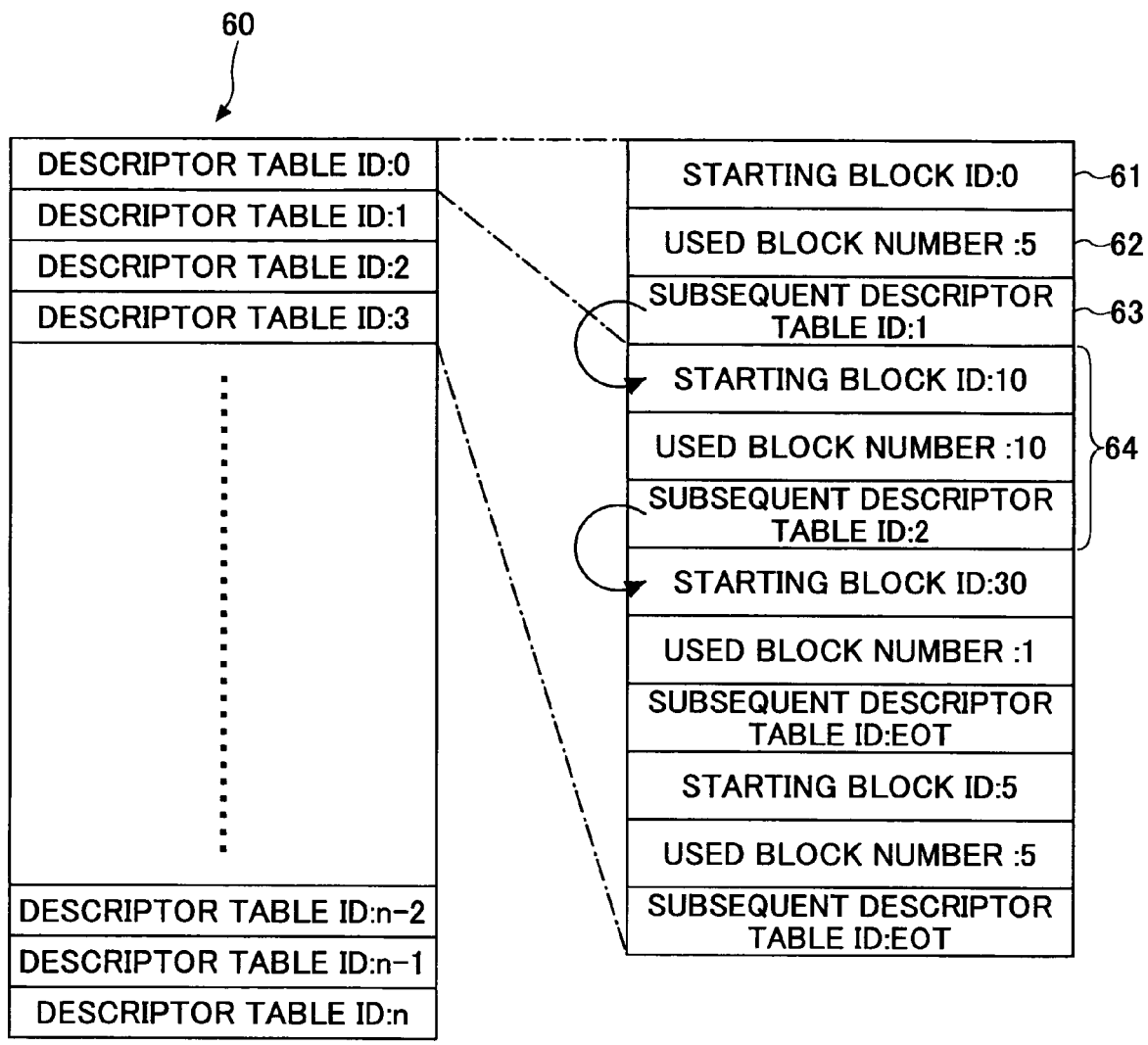
FIG. 10 shows a descriptor table according to the embodiment of the present invention.

Referring to FIG. 10, the descriptor table 60 includes a plurality of unit descriptor tables 64 each composed of a starting block ID area 61 in which a starting block ID is set, a used block number area 62 in which the number of used blocks is set, and a subsequent descriptor table ID area 63 in which a subsequent descriptor table ID is set.

An EOB (end of block) code is inserted into the starting block ID area 61 when the corresponding descriptor is unused.

The number of used blocks set in the used block number area 62 signifies the number of blocks obtained successively from the starting block.

The subsequent descriptor table ID is set in the subsequent descriptor table ID area 63 so that a desired SRC or DST region may be obtained and managed noncontiguously by a chain structure when it is impossible to use the SRC or DST region contiguously. In the subsequent descriptor table ID area 63 of the unit descriptor table corresponding to the end of the chain, EOT (end of table) is set as the subsequent descriptor table ID.

In the initial state of the descriptor table 60, EOB is set in the starting block ID area 61, zero (0) is set in the used block number area 62, and EOT is set in the subsequent descriptor table ID area 63 in each unit descriptor table 64.

Figure 11:
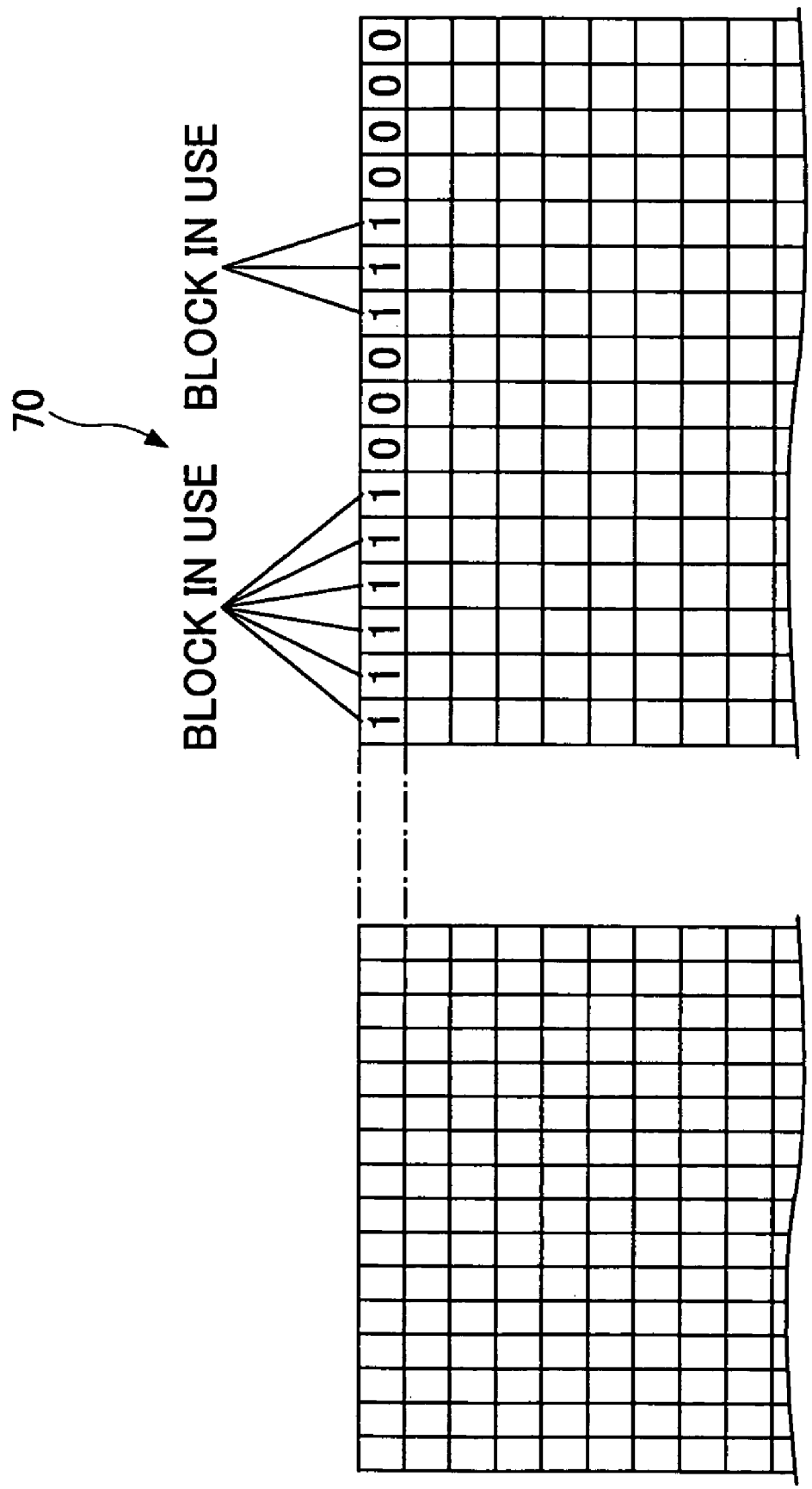
FIG. 11 shows a block table according to the embodiment of the present invention.

Referring to FIG. 11, the block table 70 divides the image memory 39 into blocks of a fixed-length size (hereinafter, this division is referred to as blocking), and expresses the state of use of each block obtained by the blocking by 1 bit. According to this embodiment, a block in which 0 is set is defined as an unused block, and a block in which 1 is set is defined as a block in use.

For instance, in the case where 9 MB for data conversion (compression) is the desired SRC and DST regions and the fixed-length size (a block) is 4 KB, it is found by the following calculation that a bit table of 2304 bits is required, letting one block correspond to 1 bit.

$$9216(KB) \div 4(KB) = 2304(blocks)$$

In the initial state (unused state) of the block table 70, zero (0) is set in each block.

A single image data item uses at least one block, which requires one unit image ID table 53 and one unit descriptor table 64. Accordingly, the maximum number of unit tables of each of the image ID table 50 and the descriptor table 60 may be the number of blocks.

The MLB 40 further includes various counter buffers such as a table ID counter and an obtained descriptor table counter used in obtaining and freeing the SRC and DST regions in the image memory 39. The MLB 40 also includes a block ID counter, a starting block ID counter, and an unused block counter used in obtaining and freeing the SRC and DST regions in the image memory 39.

A description is given next of the HDD controller 37 shown in FIG. 4. The HDD controller 37, which is composed of a CPU and logics (not graphically represented), reads the status of the HDD 38 and transfers data. The HDD controller 37 can communicate freely with the memory controller 33. The HDD controller 37 receives a command through the communication with the memory controller 33, and performs operation setting in accordance with the received command. Further, the HDD controller 37 transmits status information to the memory controller 33 to inform the memory controller 33 of the status of the HDD controller 37.

The HDD 38, which is a secondary storage device driven and controlled by the HDD controller 37, stores image data output from the compressor/decompressor 36. Since the HDD 38 is a prior-art technology, a description thereof is omitted. In the HDD 38, the above-described image ID table 50, descriptor table 60, and block table 70 are provided. Since the storage area of the HDD 38 is larger in capacity than a primary storage area, the block table 70 of the HDD 38 manages the unit of blocking (into blocks of a fixed-length size) using a group of sectors contiguous on logical addresses.

A description is given next of a bad sector of the HDD 38. Access to the HDD 38 is made using not physical addresses but logical addresses. If a sector specified by a logical address is a bad sector when access is made to the HDD 38, the HDD 38 automatically substitutes the bad sector with a substitute sector so as to perform control as if sectors were contiguously usable on logical addresses. However, the contiguity of physical addresses is lost at the physical address of the bad sector by substituting the bad sector with the substitute sector. This causes a head seek to occur, thus affecting, although slightly, data transfer time.

Therefore, according to this embodiment, the HDD 38 includes an inaccessible sector table 80 for managing the address of a bad sector so as to prevent the address from being accessed in order to suppress sector substitution by the HDD 38. The inaccessible sector table 80 is referred to at the time of obtaining and freeing the SRC and DST regions in the HDD 38, which is described later.

Figure 12:
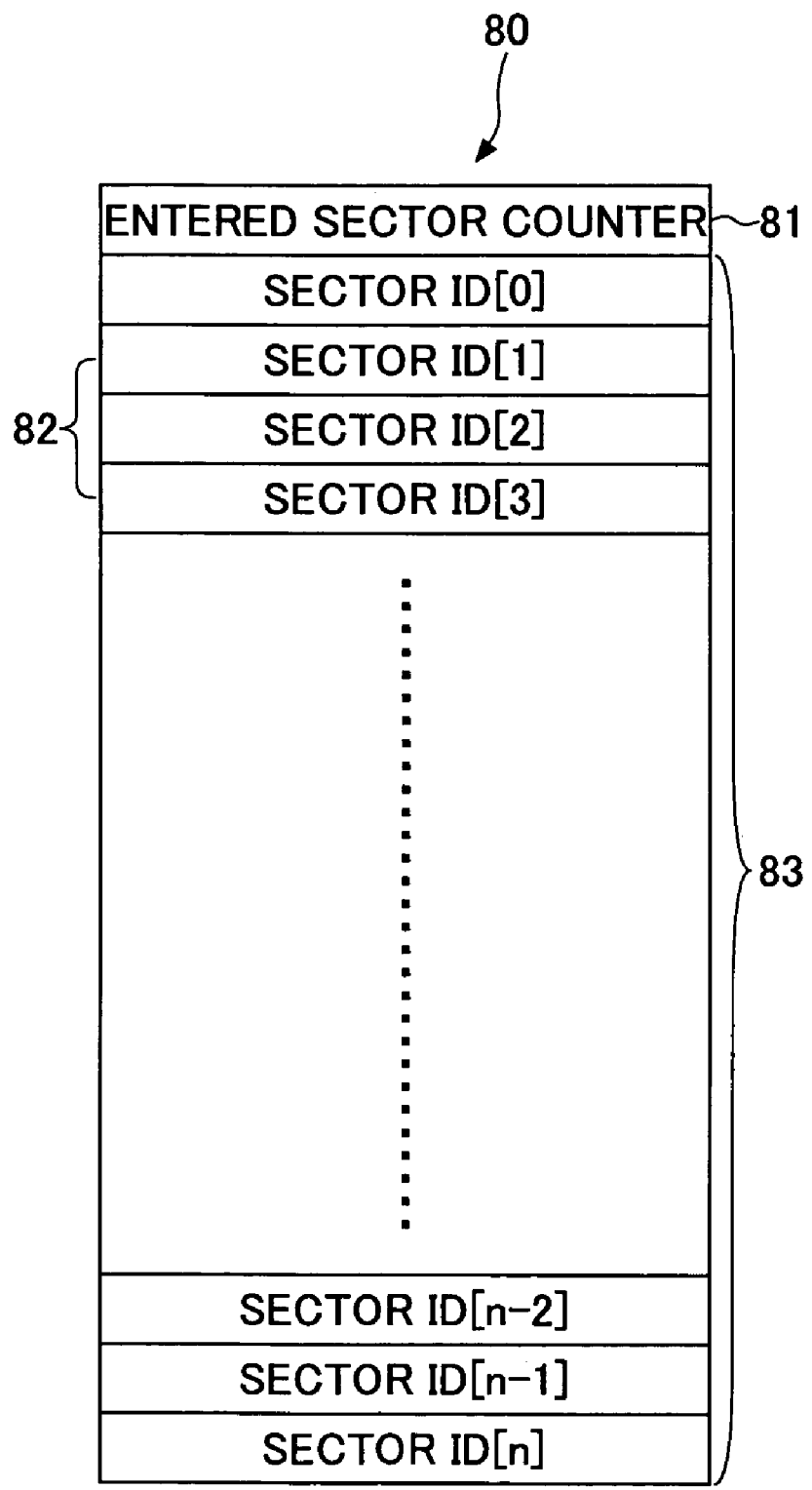
FIG. 12 shows an inaccessible sector table according to the embodiment of the present invention.

Referring to FIG. 12, the inaccessible sector table 80 includes an entered sector counter 81 that counts sectors entered as inaccessible sectors inhibited from being accessed and an access inhibition table 83 including a plurality of sector ID areas 82 in each of which a sector ID is set. In the initial state of the inaccessible sector table 80, zero (0) is set in each sector ID area 82. The entered sector counter 81 is provided to prevent a sector having a sector ID of 0 from being wrongly detected as a sector inhibited from being accessed (or an inaccessible sector) when the sector ID area 82 is set to 0 in the initial state. The entered sector counter 81 indicates the number of sectors entered in the access inhibition table 83. In this embodiment, when the entered sector counter 81 reads 0, it shows that no inaccessible sector is entered. When the digital copier 1 is turned on, the contents of the entered sector counter 81 and the access inhibition table 83 are transferred from the HDD 38 to the memory dedicated to image conversion (compression) in the image memory 39 so as to be able to be referred to.

It is preferable that the inaccessible sector table 80 be provided to a large-capacity storage device such as the HDD 38.

The inaccessible sector table 80 manages the unit of access inhibition not by the block but by the sector. This makes it possible to prevent the occurrence of a defect such as the mismatch between an entered bad sector and a block. Such a mismatch is caused by the shift of the starting sector of a starting block due to a change in a usable starting sector address caused by a change in the number of sectors at the time of blocking or a partition change in the HDD 38.

Further, like the image memory 39, the HDD 38 includes various counter buffers such as a table ID counter and an obtained descriptor table counter, a block ID counter, a starting block ID counter, and an unused block counter used in obtaining and freeing the SRC and DST regions in the HDD 38. In addition, the HDD 38 includes a counter for internal loop operation (a loop counter).

By the above-described configuration, the storage part 3 writes image data to or reads image data from a predetermined image region of the image memory 39 in accordance with an instruction from the system controller 7 when an image is input and data is stored. At the time of writing or reading image data, the image transfer DMAC 34 counts the number of image lines.

Figure 13:
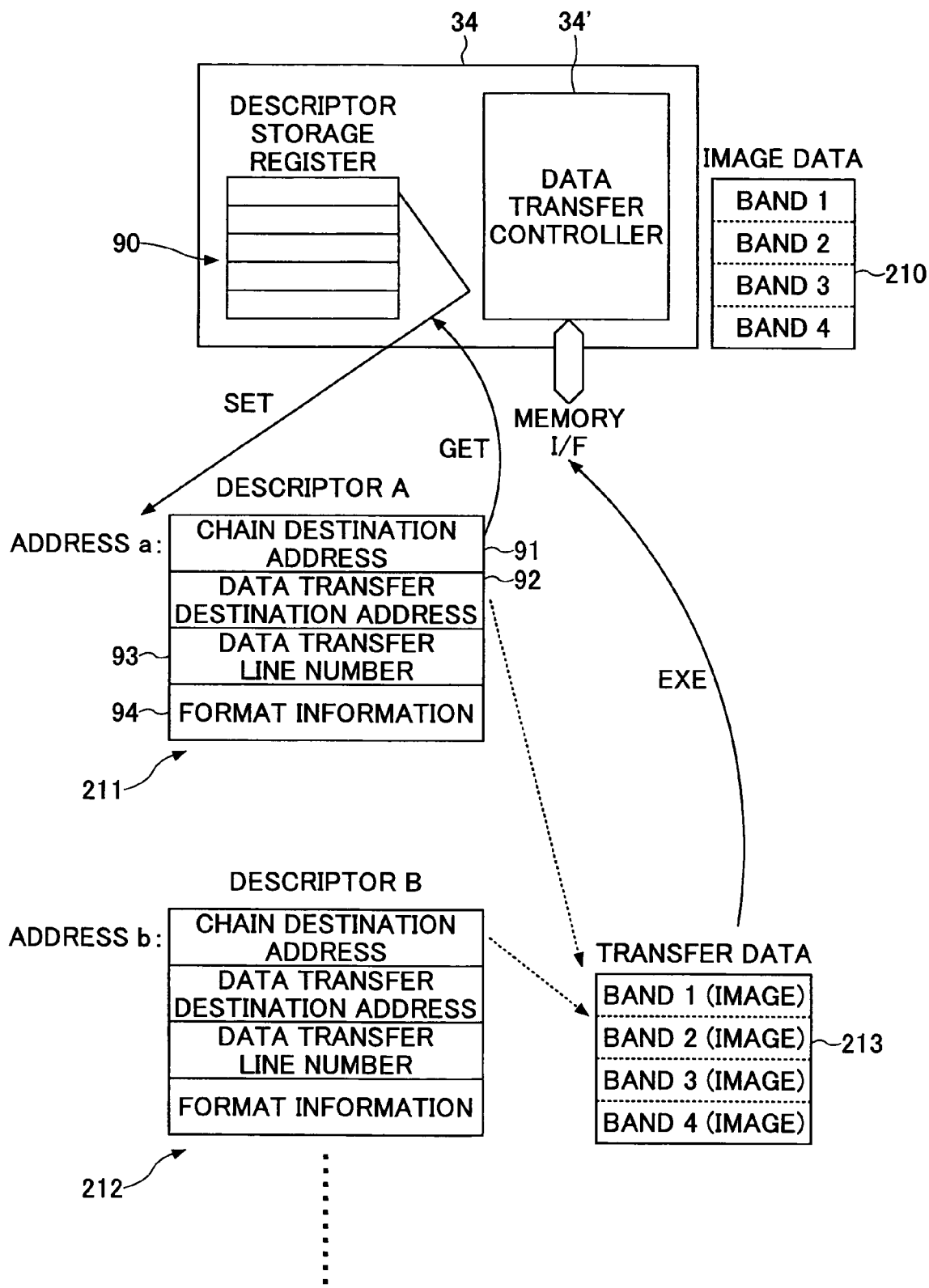
FIG. 13 is a diagram for illustrating a descriptor storage register in an image transfer DMAC of the storage part according to the embodiment of the present invention.

Further, a descriptor storage register for storing a descriptor is reserved in each of the image input/output DMAC 32, the image transfer DMAC 34, and the code transfer DMAC 35. FIG. 13 is a diagram showing the image transfer DMAC 34 and a descriptor storage register 90 therein. The image transfer DMAC 34 includes a data transfer controller 34 controlling image data transfer. The descriptor storage register 90 is reserved in the storage area of the data transfer controller 34. In the descriptor storage register 90, a region 91 for storing a chain destination address indicating the storage address of a subsequent descriptor, a region 92 for storing a data transfer destination address indicating the starting address of data to be transferred, a region 93 for storing a data transfer line number indicating the amount of the data to be transferred by the number of lines, and a region 94 for storing format information as to whether to generate a CPU interrupt when the transfer of a set number of lines is completed are reserved for each address. In each descriptor storage register, the chain destination address is preset in the region 91 by the CPU. A bit representing whether to generate a CPU interrupt when the transfer of a set number of lines is completed is provided in the least significant bit of the formation information in the region 94. In this embodiment, the CPU interrupt is generated when the least significant bit of the format information is 1, and the CPU interrupt is disabled by a request mask when the least significant bit of the format information is 0. Reference numerals 91 through 94 may also refer to the information stored in the respective regions 91 through 94.

A description is given next of a descriptor access operation and a data transfer operation, taking the image transfer DMAC 34 as an example. FIG. 13 is a diagram showing the descriptor access operation and the data transfer operation of the image transfer DMAC 34. Referring to FIG. 13, according to this embodiment, image data 210 defined by the numbers of lines set respectively in four bands into which the image data 210 is divided is transferred by the image transfer DMAC 34.

FIG. 13 shows the image transfer DMAC 34, the image data 210, transfer data 213, a descriptor A 211, and a descriptor B 212. The image data 210 is composed of four image data items. The transfer data 213 is the image data 210 to be transferred. Each of the descriptor A 211 and the descriptor B 212 includes the chain destination address 91, the data transfer destination address 92, the data transfer line number 93 and the format information 94.

In the case of calculating the total number of lines in an image, the memory controller 33, receiving a transfer command from the system controller 7, transmits the transfer command to the image transfer DMAC 34.

Receiving the transfer command from the memory controller 33, the image transfer DMAC 34 activates a DMA, and accesses the chain destination address set in the descriptor storage register 90 (for instance, ADDRESS a in FIG. 13) to read the descriptor A 211 in the image memory 39, thereby loading the contents of the descriptor A 211 into the descriptor storage register 90.

As described above, the information loaded into the descriptor storage register 90 is composed of the four words of the chain destination address 91, the data transfer destination address 92, the data transfer line number 93, and the format information 94. Accordingly, in the case of dividing an image into four bands, the format information of four descriptors is loaded into the descriptor storage register 90, and 1 is provided in the least significant bit of the format information in each of the regions 94 of the four descriptors. The CPU interrupt occurs when the transfer of the image data of each band is completed. The occurrence of the CPU interrupt causes the number of lines set in each descriptor to be added. As a result, the number of transferred lines, or a transferred line number, can be detected.

A description is given next of the operations of obtaining and freeing the SRC and DST regions in the storage part 3. In these operations, the above-described three management tables of the image ID table 50, the descriptor table 60, and the block table 70 are employed.

Figure 14:
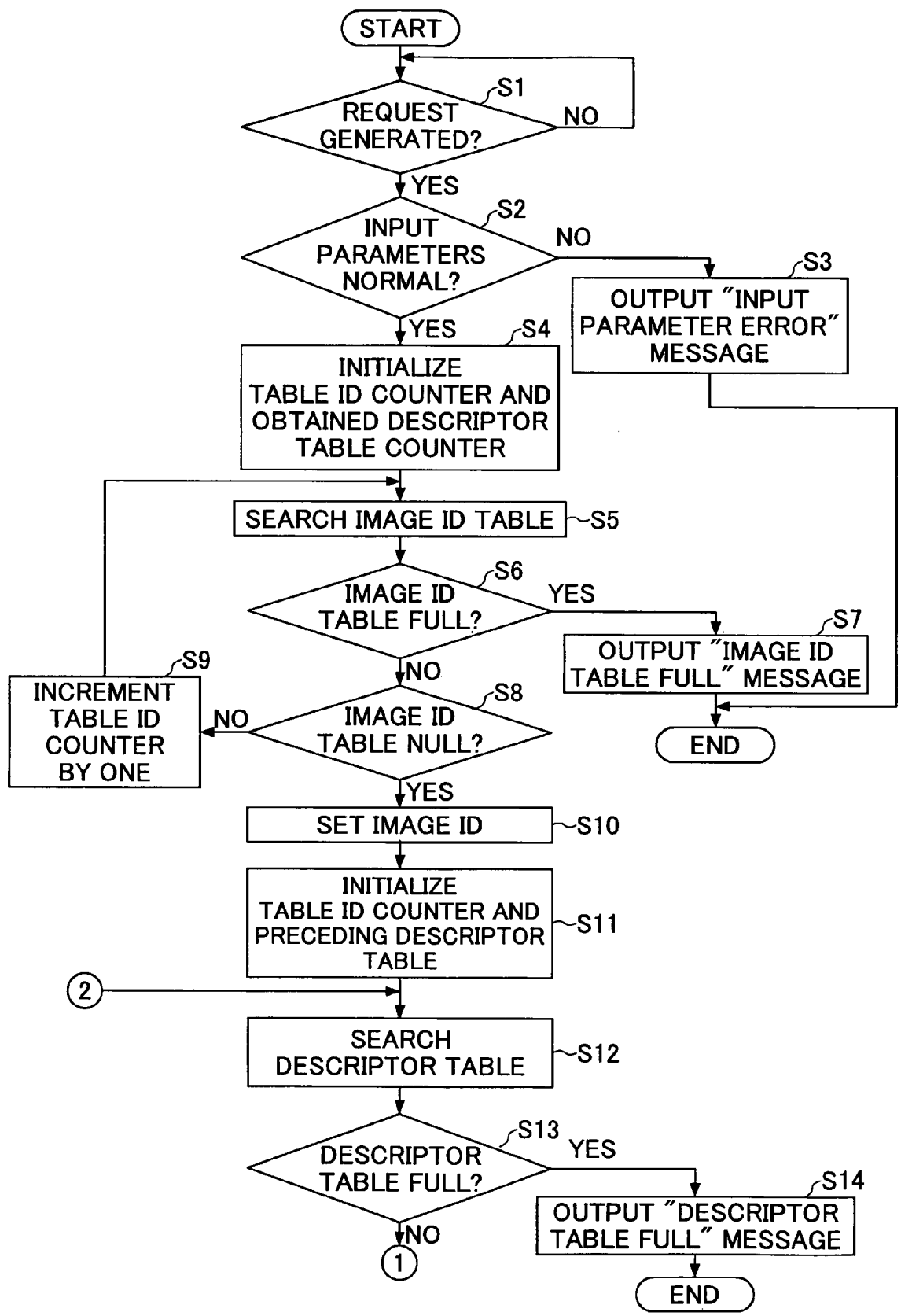
FIG. 14 is a flowchart for illustrating the operation of obtaining an SRC region and a DST region in the storage part according to the embodiment of the present invention.
Figure 15:
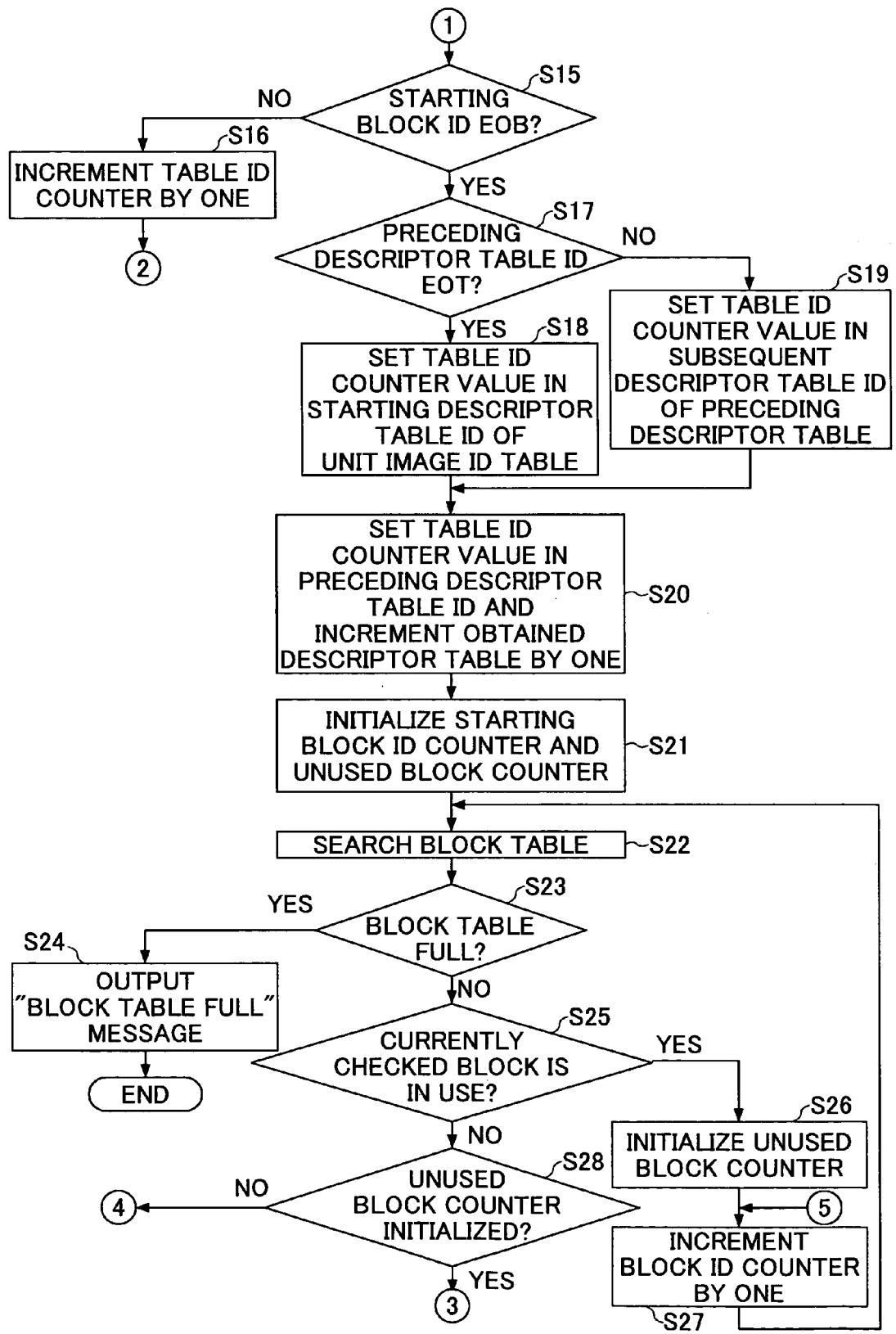
FIG. 15 is another flowchart for illustrating the operation of obtaining the SRC and DST regions in the storage part according to the embodiment of the present invention.
Figure 16:
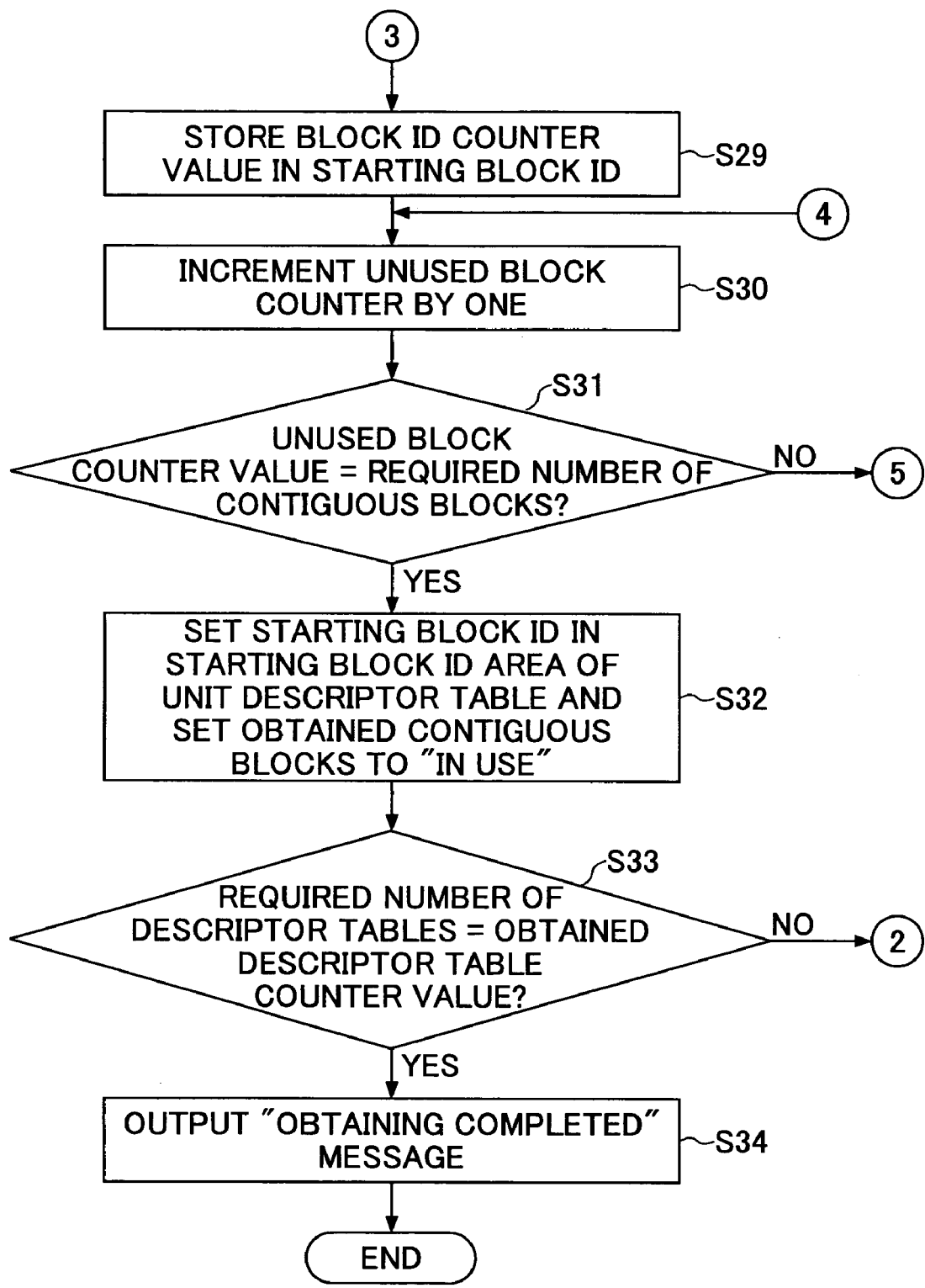
FIG. 16 is another flowchart for illustrating the operation of obtaining the SRC and DST regions in the storage part according to the embodiment of the present invention.

First, a description is given, with reference to FIGS. 14 through 16, of the operation of obtaining the SRC and DST regions in the storage part 3.

The operation of FIGS. 14 through 16 includes the operation of searching for space in the image ID table 50, the operation of searching out free descriptors from the descriptor table 60 and connecting them if necessary, and the operation of obtaining blocks necessary for the descriptors.

In the case of obtaining the SRC and DST regions in the storage part 3, first, in step S1 of FIG. 14, a wait state continues until the memory controller 33 determines that a request to obtain the SRC or DST region is generated by determining the presence or absence of the input of obtaining request data including an image ID, the number of contiguous blocks (a contiguous block number) indicating the contiguity of blocks to be obtained, and the number of descriptor tables (a descriptor table number) that makes it possible to give an instruction to obtain a plurality of contiguous block numbers.

If the memory controller 33 determines in step S1 that the request to obtain the SRC or DST region has been generated by the input of the obtaining request data, in step S2, the memory controller 33 determines whether there is abnormality in the data representing the image ID, the contiguous block number, and the descriptor table number included in the input obtaining request data.

If the memory controller 33 determines in step S2 that there is abnormality in the data representing the image ID, the contiguous block number, and the descriptor table number included in the input obtaining request data, in step S3, the memory controller 33 outputs a message "INPUT PARAMETER ABNORMAL (ERROR)," and ends the operation.

On the other hand, if the memory controller 33 determines in step S2 that there is no abnormality in the data representing the image ID, the contiguous block number, and the descriptor table number included in the input obtaining request data, in step S4, the memory controller 33 initializes the table ID counter and the obtained descriptor table counter required at the time of obtaining the unit image ID table 53. Then, in step S5, the memory controller 33 searches the image ID table 50 for a free or unoccupied unit image ID table 53.

If the table ID counter reaches the last table ID value before detecting the unit image ID table 53 where NULL is set in the image ID area 51 in the search of step S5, in step S6, the memory controller 33 determines that all the unit image ID tables 53 are occupied (in use) and it is impossible to obtain a free or unoccupied unit image ID table 53. Then, in step S7, the memory controller 33 outputs a message "IMAGE ID TABLE FULL," and ends the operation.

On the other hand, if the table ID counter does not show the last table ID value so that the memory controller 33 determines in step S6 that the image ID table 50 is not FULL, in step S8, the memory controller 33 determines whether NULL is set in the image ID area 51. If the memory controller 33 determines in step S8 that NULL is not set in the image ID area 51, in step S9, the memory controller 33 increments the table ID counter by one, and performs step S5 again.

If the memory controller 33 determines in step S8 that NULL is set in the image ID area 51, the memory controller 33 determines that a free unit image ID table 53 exists, and in step S10, the memory controller 33 sets the image ID included in the obtaining request data in the image ID area 51 of the free unit image ID table 53.

Next, in step S11, the memory controller 33 initializes the table ID counter and a preceding descriptor table. The preceding descriptor table does not exist in the actual descriptor table 60, and is a local variable on the program. The structure of the preceding descriptor table is formed by adding another descriptor table ID to the structure of the unit descriptor table 64 (FIG. 10). Hereinafter, the added descriptor table ID of the preceding descriptor table is referred to as a preceding descriptor table ID.

Referring back to the flowchart of FIG. 14, in step S12, the memory controller 33 searches the descriptor table 60 from its beginning for the unit descriptor table 64 where EOB is set in the starting block area 61.

If the table ID counter reaches the last table ID value as a result of the search of the descriptor table 60 in step S12, in step S13, the memory controller 33 determines that all the unit descriptor tables 64 are occupied (in use) (the descriptor table 60 is FULL) and it is impossible to obtain a free unit descriptor table 64. Therefore, in step S14, the memory controller 33 outputs a message "DESCRIPTOR TABLE FULL," and ends the operation.

On the other hand, if as a result of the search of step S12, the memory controller 33 determines in step S13 that the descriptor table 60 is not FULL, that is, the table ID counter does not reach the last table ID value, the operation proceeds to step S15 of FIG. 15. If the memory controller 33 determines in step S15 that the starting block ID in the starting block ID area 61 is not EOB, in step S16, the memory controller 33 increments the table ID counter by one, and performs the operation of step S12 again.

If the memory controller 33 determines in step S15 that the starting block ID in the starting block ID area 61 is EOB, the memory controller 33 determines that a free unit descriptor table 64 exists, and in step S17, the memory controller 33 determines whether the preceding descriptor table ID is EOT.

If the memory controller 33 determines in step S17 that the preceding descriptor table ID is EOT, in step S18, the memory controller 33 sets the counter value of the table ID counter in the starting descriptor table ID area 52 of the unit image ID table 53 obtained by the above-described operation.

On the other hand, if the memory controller 33 determines in step S17 that the preceding descriptor table ID is not EOT, in step S19, the memory controller 33 sets the counter value of the table ID counter in the subsequent descriptor table ID area 63 of the preceding descriptor table 64.

Next, in step S20, the memory controller 33 sets the obtained counter value of the table ID counter in the preceding descriptor table ID of the preceding descriptor table 64, and increments the obtained descriptor table counter.

Next, in step S21, the memory controller 33 initializes the starting block ID counter and the unused block counter required for obtaining blocks. Then, in step S22, the memory controller 33 searches the block table 70 from its beginning for a bit in which 0, indicating the unused state, is set.

If as a result of the search of step S22, the memory controller 33 determines in step S23 that the block table 70 is FULL, that is, the block ID counter reaches the last block ID value, the memory controller 33 determines that all the blocks are occupied (in use) and it is impossible to obtain a free block. Then, in step S24, the memory controller 33 outputs a message "BLOCK TABLE FULL," and ends the operation.

On the other hand, if the memory controller 33 determines in step S23 that the block table 70 is not FULL, in step S25, the memory controller 33 determines whether the (currently checked) block is in use.

If in step S25, the bit of the block is 1, and the memory controller 33 determines that the block is in use, in step S26, the memory controller 33 initializes the unused block counter. Then, in step S27, the memory controller 33 increments the block ID counter by one, and performs step S22 again.

If in step S25, the bit of the block is not 1, and the memory controller 33 determines that the block is unused, in step S28, the memory controller 33 determines whether the unused block counter is initialized.

If the memory controller 33 determines in step S28 that the unused block counter is not initialized, the operation proceeds to step S30 of FIG. 16. If the memory controller 33 determines in step S28 that the unused block counter is initialized, in step S29, the memory controller determines that the unused block is a starting block at which to start to obtain contiguous blocks, and causes the starting block ID area 61 to retain the counter value of the block ID counter for this unused block. Then, in step S30, the memory controller 33 increments the unused block counter by one.

Then, in step S31, the memory controller 33 determines whether the unused block counter has counted a required number of blocks. If the memory controller 33 determines in step S31 that the unused block counter has not counted a required number of blocks, the memory controller 33 performs step S27 again.

If the memory controller 33 determines in step S31 that the unused block counter has counted a required number of blocks, in step S32, the memory controller 33 sets the starting block ID in the starting block ID area 61 of the unit descriptor table 64, and sets the state of obtained contiguous blocks to "in use."

Next, in step S33, the memory controller 33 compares the number of descriptor tables (the descriptor table number) in the obtaining request data with the counter value of the obtained descriptor table counter.

If the descriptor table number matches the counter value of the obtained descriptor table counter as a result of the comparison of step S33, the memory controller 33 determines that the obtaining of the requested SRC or DST region is completed. Then, in step S34, the memory controller 33 outputs a message "OBTAINING COMPLETED," and ends the operation.

If the descriptor table number does not match the counter value of the obtained descriptor table counter as a result of the comparison of step S33, the memory controller 33 performs step S12 again.

As a result, the SRC and DST regions in the storage part 3 may be obtained.

The SRC and DST regions thus obtained are also used for usual operations such as printing, scanning, and facsimile communication. Therefore, using the SRC and DST regions for image conversion may affect the productivities of other operations.

Accordingly, in this embodiment, a region for image conversion is separately prepared in the image memory 39. With respect to this region for image conversion, only whether the region is being used by another operation is managed, and the region for image conversion can be used dynamically as only the SRC or DST region or both SRC and DST regions in a single conversion by the page.

Figure 17:
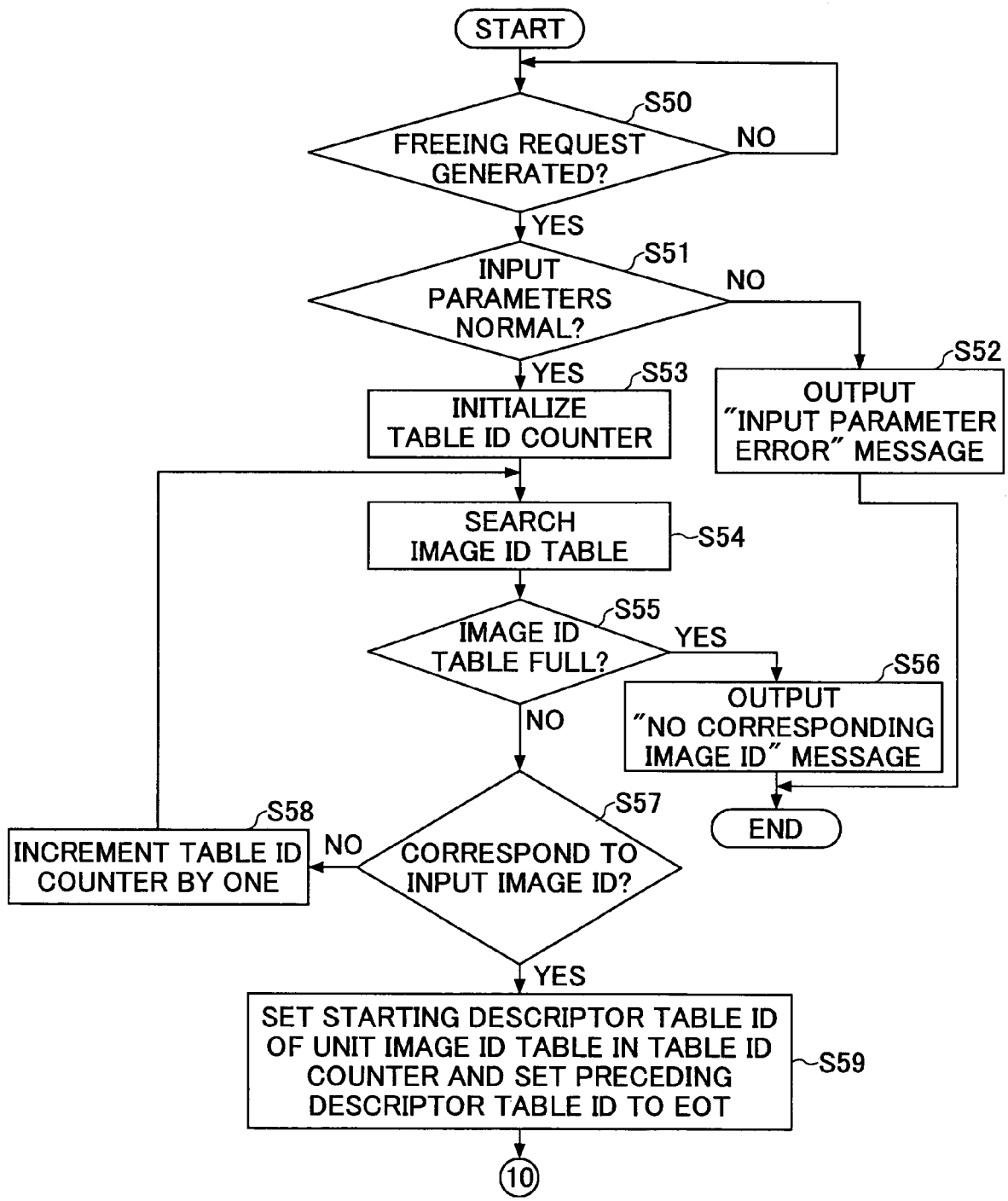
FIG. 17 is a flowchart for illustrating the operation of freeing the SRC and DST regions in the storage part according to the embodiment of the present invention.
Figure 18:
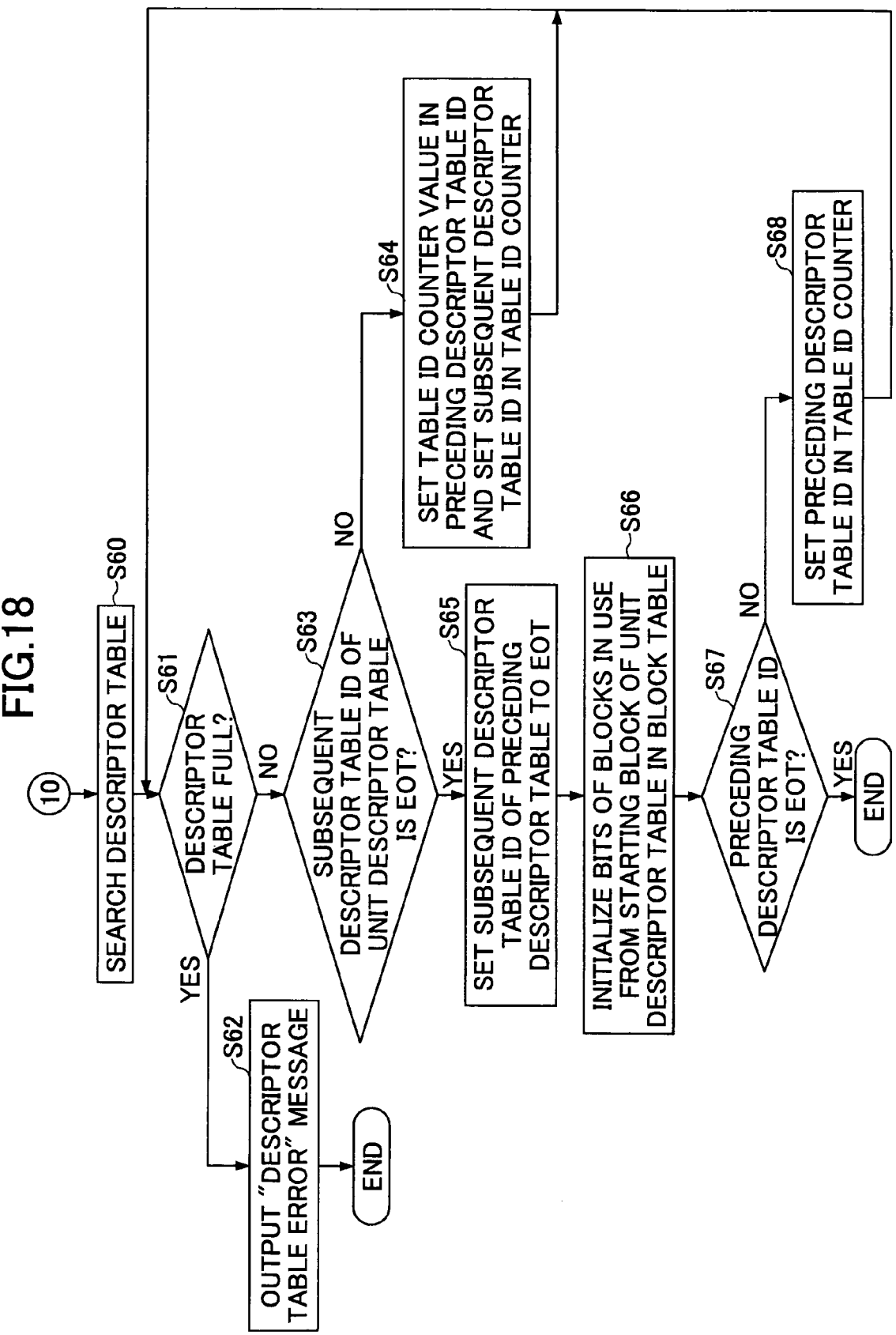
FIG. 18 is another flowchart for illustrating the operation of freeing the SRC and DST regions in the storage part according to the embodiment of the present invention.

A description is given next, with reference to FIGS. 17 and 18, of the operation of freeing the SRC and DST regions in the storage part 3.

In step S50 of FIG. 17, a request to free the SRC or DST region (a freeing request) is awaited. If the memory controller 33 determines that the freeing request is generated, the operation proceeds to step S51. In step S51, the memory controller 33 determines whether input parameters in the feeing request are normal. If the input parameters are abnormal, in step S52, the memory controller 33 outputs a message "INPUT PARAMETER ERROR," and ends the operation.

If the memory controller 33 determines in step S51 that the input parameters are normal, in step S53, the memory controller 33 initializes the table ID counter required in searching for the unit image ID table 53. Then, in step S54, the memory controller 33 searches the image ID table 50 from its beginning for the unit image ID table 53 having the image ID area 51 in which an image ID identical to the image ID included in the input parameters (or the input image ID) is set.

If the memory controller 33 determines in step S55 that the table ID counter reaches the last table ID before determining that the image ID in the image ID area 51 matches the input image ID, the memory controller 33 determines that there is no corresponding unit image ID table 53. Then, in step S56, the memory controller 33 outputs a message "NO CORRESPONDING IMAGE ID," and ends the operation.

On the other hand, if the memory controller 33 determines in step S55 that the image ID table 50 is not FULL (fully checked), in step S57, the memory controller 33 determines whether the image ID of the (currently checked) unit image ID table 53 corresponds to the input image ID. If the memory controller 33 determines in step S57 that the image ID of the unit image ID table 53 does not correspond to the input image ID, in step S58, the memory controller 33 increments the table ID counter by one, and performs step S54 again.

If the memory controller 33 determines in step S57 that the image ID of the unit image ID table 53 corresponds to the input image ID, in step S59, the memory controller 33 sets the starting descriptor table ID of the unit image ID table 53 in the table ID counter, and sets the preceding descriptor table ID to EOT.

Next, in step S60 of FIG. 18, the memory controller 33 searches the descriptor table 60. If the memory controller 33 determines in step S61 that the descriptor table 60 is FULL (fully checked), in step S62, the memory controller 33 outputs a message "DESCRIPTOR TABLE ERROR," and ends the operation.

If the memory controller 33 determines in step S61 that the descriptor table 60 is not FULL (fully checked), in step S63, the memory controller 33 determines whether the subsequent descriptor table ID of the (currently checked) unit descriptor table 64 is EOT. If the subsequent descriptor table ID of the (currently checked) unit descriptor table 64 is not EOT, in step S64, the memory controller 33 sets the counter value of the table ID counter in the preceding descriptor table ID, and sets the subsequent descriptor table ID in the table ID counter. Then, the memory controller 33 performs step S61 again.

If the subsequent descriptor table ID of the unit descriptor table 64 is EOT in step S63, in step S65, the memory controller 33 sets the subsequent descriptor table ID of the preceding descriptor table to EOT.

Next, in step S66, the memory controller 33 initializes as many bits in the block table 70 as the number of blocks in use from the starting block of the unit descriptor table 64. Then, in step S67, the memory controller 33 determines whether the preceding descriptor table ID is EOT. If the preceding descriptor table is not EOT, in step S68, the memory controller 33 sets the preceding descriptor table ID in the table ID counter, and performs step S61 again.

If the preceding descriptor table ID is EOT, the memory controller 33 ends the operation.

Next, a description is given of the operations of obtaining and freeing the SRC and DST regions in the HDD 38. Of the operations of obtaining and freeing the SRC and DST regions in the HDD 38, the same operations as the operations of managing the obtaining and freeing of the SRC and DST regions in the image memory 39 have their description and graphical representation omitted, and an operation relating to the inaccessible sector table 80 provided in only the HDD 38 is described below with reference to FIG. 19.

In the HDD 38, the obtained SRC and DST regions are released when not in use. As a result, the regions other than the SRC and DST regions in use can be used by other operations, so that the HDD 38 can be used effectively.

Figure 19:
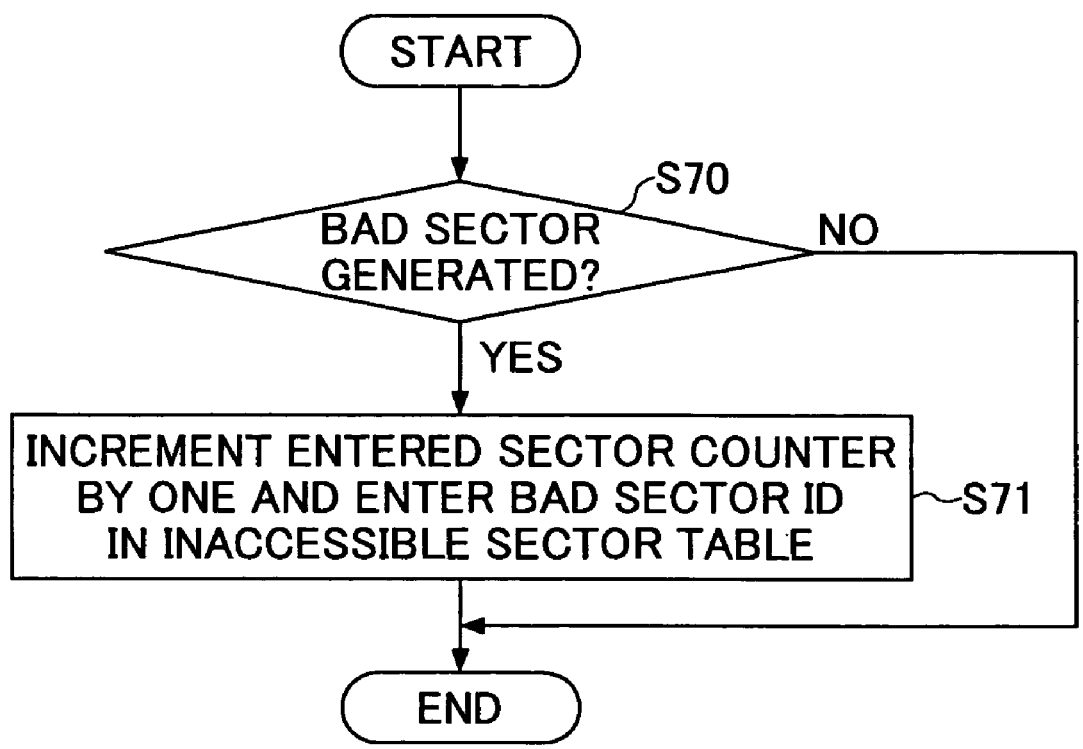
FIG. 19 is a flowchart of the operation of entering a bad sector as an inaccessible sector according to the embodiment of the present invention.

FIG. 19 is a flowchart of the operation of entering a bad sector as an inaccessible sector. Normally, a bad sector is detected when the HDD 38 is read. Accordingly, this entering operation occurs at the time of reading the HDD 38.

In the entering operation, first, in step S70, the memory controller 33 determines whether a read-out sector is a bad sector.

If the memory controller 33 determines in step S70 that no bad sector is generated, the memory controller 33 ends the operation.

If the memory controller 33 determines in step S70 that the read-out sector is a bad sector, in step S71, the memory controller 33 increments the entered sector counter 81 (FIG. 12) by one, and enters the address (ID) of the bad sector in the $n^{th}$ sector ID table 82 of the access inhibition table 83, n being the counter value of the entered sector counter 81. Then, the memory controller 33 ends the operation. Although not graphically represented, if the entered sector counter 81 is managed by setting a limit to its counter value and the number of bad sectors exceeds the limit, it is possible to advise the replacement of the HDD 38 on the ground of reduction in the reliability of the HDD 38 due to the generation of a large number of inaccessible sectors attributed to bad sectors.

Figure 20:
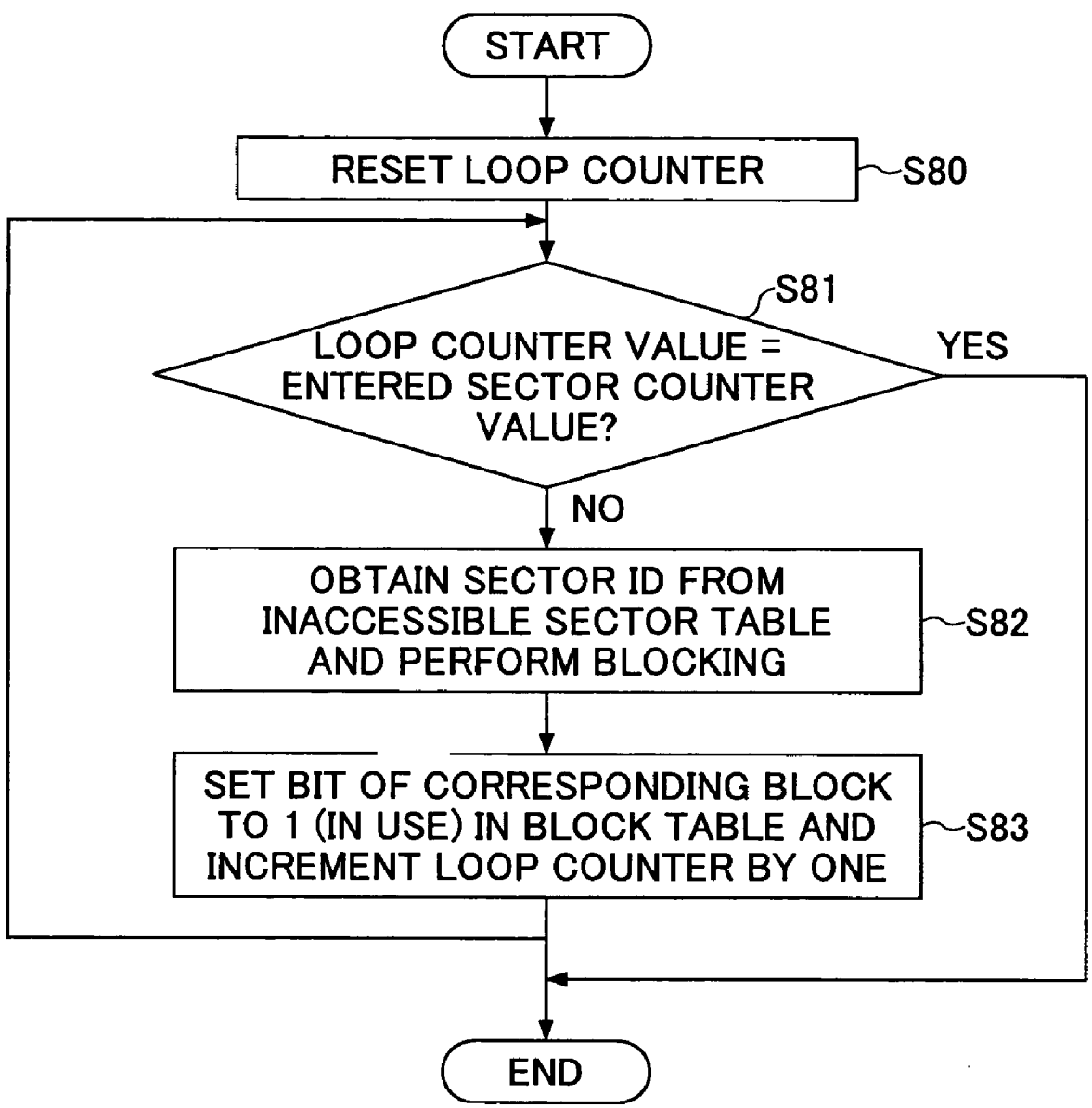
FIG. 20 is a flowchart of the operation of reflecting the inaccessible sector in the block table of an HDD according to the embodiment of the present invention.

A description is given next, with reference to FIG. 20, of the flow of the operation of reflecting an inaccessible sector in the block table 70 (FIG. 11) of the HDD 38.

After initializing the block table in the HDD 38, in step S80, the memory controller 33 resets the loop counter (counter for internal loop operation).

Next, in step S81, the memory controller 33 compares the loop counter and the entered sector counter 81. If the memory controller 33 determines in step S81 that the counter values of the loop counter and the entered sector counter 81 are equal, the memory controller 33 ends the operation.

On the other hand, if the memory controller 33 determines in step S81 that the counter values of the loop counter and the entered sector counter 81 are not equal, the memory controller 33 determines that an inaccessible sector exists.

Then, in step S82, the image controller 33 obtains the sector ID from the inaccessible sector table 80 and performs blocking.

In step S83, the memory controller 33 sets the bit of the block in the block table obtained by the blocking to 1, thereby presetting the block to the state of "in use." Further, the memory controller 33 increments the loop counter by one, and performs step S81 again.

By thus using the SRC and DST regions of the image memory 39 and the HDD 38 for image data compressed (converted) by the MLB 40, which is hardware, each of the SRC and DST regions may be obtained with any or fixed capacity.

Further, when a storage area dedicated to image conversion is provided as an image storage part as the memory (area) dedicated to image conversion in the image memory 39 of this embodiment, it is also possible to obtain the storage area as resource management (managing whether resources are in use).

In the case of dividing data transfer (transferring data in a plurality of times), the SRC and DST regions in the image memory 39 are reserved with fixed capacity, and after completing data conversion for the fixed capacity, the converted data is transferred to the HDD 38. By repeating this operation, the data can be divided and transferred.

Figure 21:
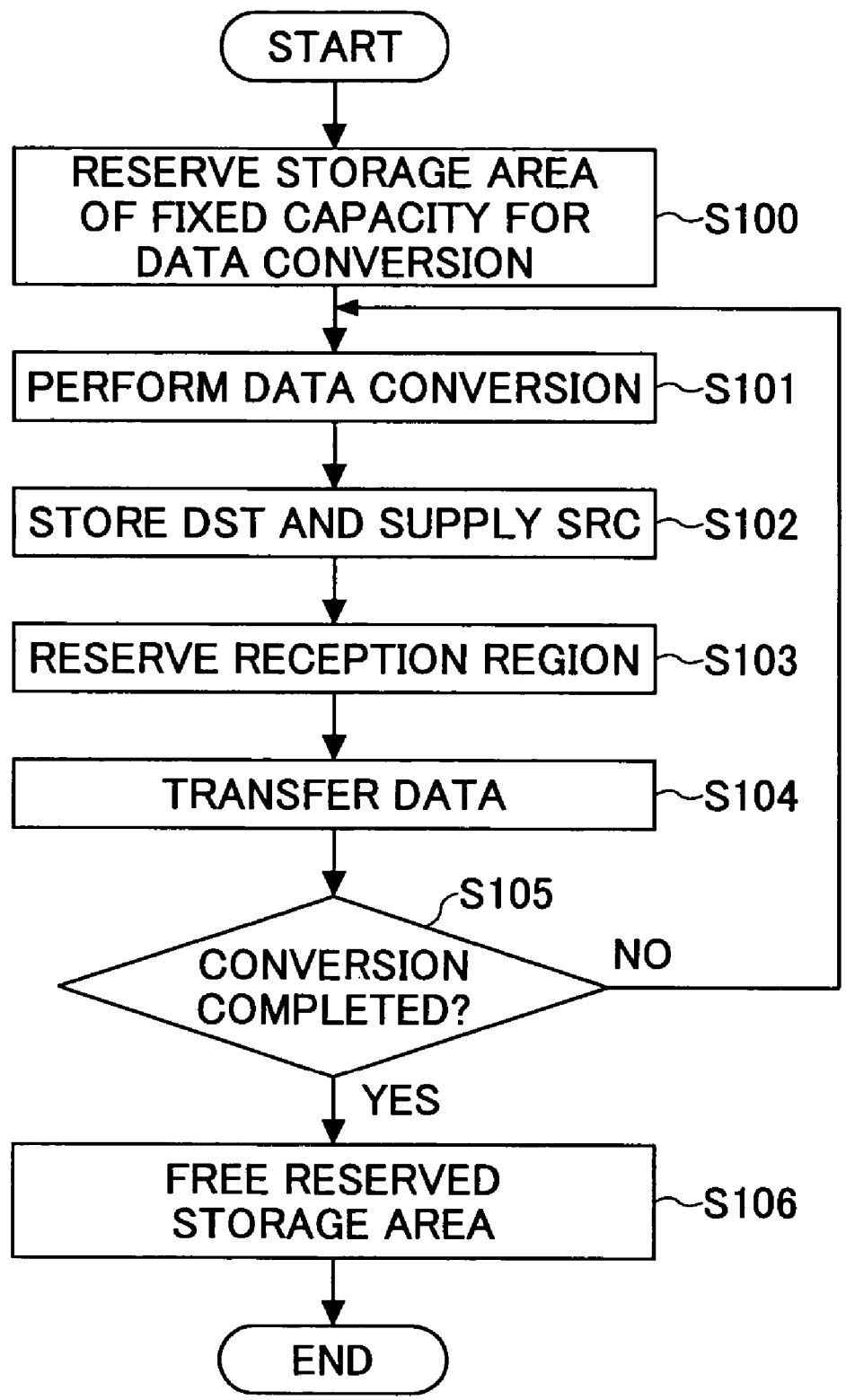
FIG. 21 is a flowchart of the operation of transferring data from an image memory to the HDD in a plurality of times according to the embodiment of the present invention.

A description is given next, with reference to FIG. 21, of the operation of transferring data from the image memory 39 to the HDD 38 in a plurality of times.

First, in step S100, the memory controller 33 reserves a storage area for data conversion with fixed capacity. Next, in step S101, the memory controller 33 converts (or compresses) image data using the MLB 40 as described above.

In step S102, the memory controller 33 stores the converted (or compressed) image data in the DST region included in the storage area reserved in step S100, and supplies image data to be converted to the SRC region.

Next, in step S103, the memory controller 33 reserves, in the HDD 38, a transfer reception region equal in capacity to the DST region used in step S102. Then, in step S104, the memory controller 33 transfers the converted data to the HDD 38. Step S103 realizes a transfer reception region reservation part and a transfer reception region reservation function. Step S104 realizes a transfer part and a transfer function.

In the case of supplying image data to be transferred from the HDD 38 to the image memory 39 in step S102, in step S104, the memory controller 33 reads the image data (region) from the HDD 38, and transfers the read image data (inversely) to the image memory 39. In this case, step S104 realizes an inverse transfer part and an inverse transfer function.

Next, in step S105, the memory controller 33 determines whether there is image data that has not been compressed. If the memory controller 33 determines in step S105 that there is image data that has not been compressed, the memory controller 33 determines that the conversion of the image data is not completed, and performs step S101 again.

In the case of proceeding again to step S101 and continuing the conversion, the transferred image data in the DST region is overwritten with newly converted image data.

If the memory controller 33 determines in step S105 that there is no image data that has not been compressed, the memory controller 33 determines that the conversion of the image data is completed. Then, in step S106, the memory controller 33 frees the storage area of the fixed capacity reserved in the image memory, and ends the operation.

The supplying of image data can be performed by similarly repeating data transfer from the HDD 38.

In the image conversion of step S101, the MLB 40, which is an ASIC for image conversion, is used. As described above, each of the software and the hardware of the MLB 40 operates in accordance with the statuses representing its states. In the image conversion of step S101, GET, EXE, and SET shown in FIG. 13 are repeated a required number of times.

When the end timing of one of the hardware and the software is reported, the other may not be able to receive processing as, for instance, the other is performing processing and its status is other than WAIT.

According to this embodiment, information reported when the hardware or the software cannot receive the report of end timing is temporarily stored, and when the hardware or the software becomes able to receive processing, the hardware or the software executes the processing immediately.

Figure 22:
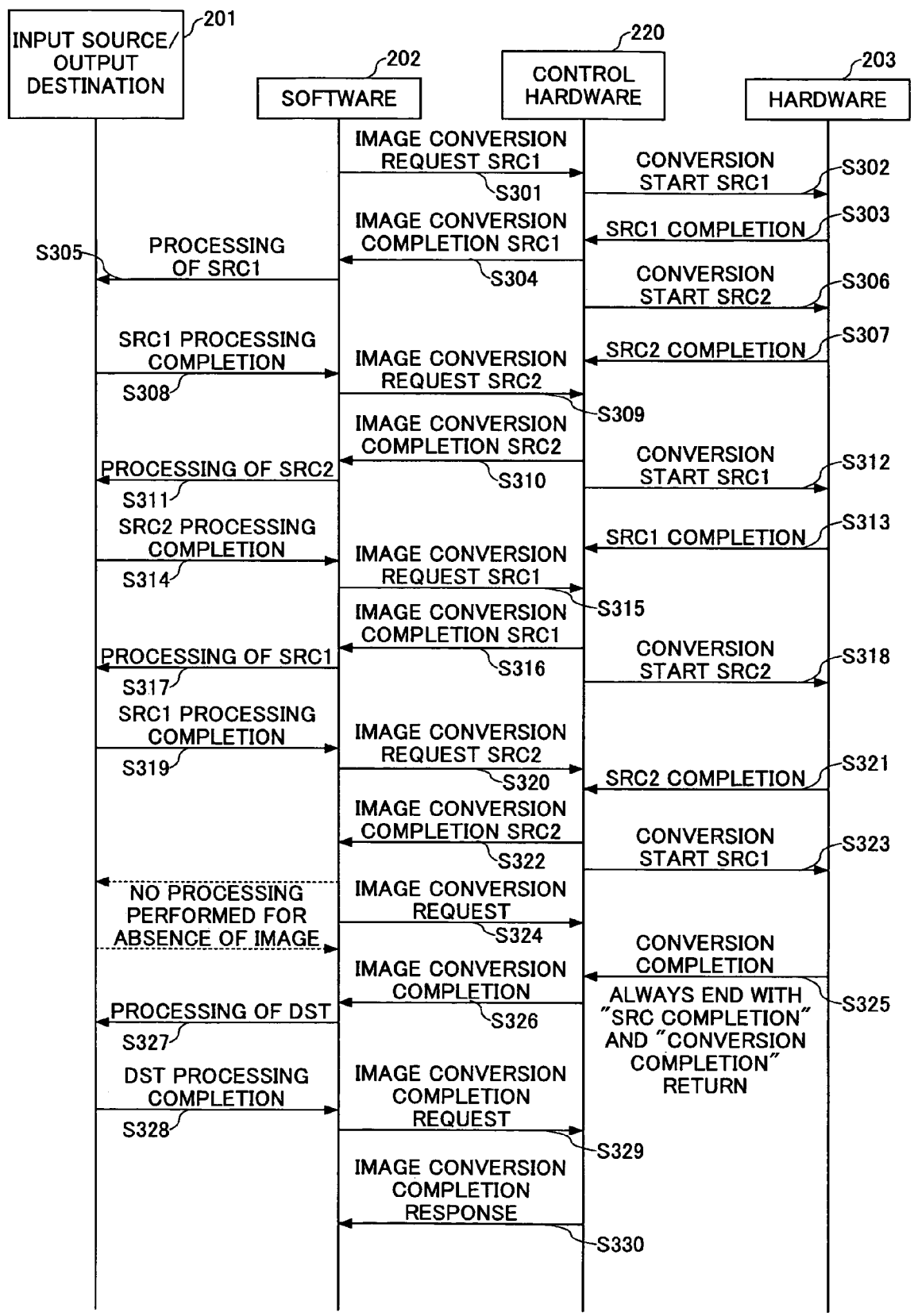
FIG. 22 is a timing chart showing operation timing in the case where the SRC region is divided and a sufficiently large conversion region is reserved for the DST region according to the embodiment of the present invention.

FIG. 22 is a timing chart showing operation timing in the case where the SRC region is divided and a sufficiently large conversion region is reserved for the DST region.

The timing chart of FIG. 22 shows the operations performed between the input source/output destination 201 such as a secondary storage area, a network, or printing output, the software 202, control hardware 220, and the hardware 203.

The I/F on the software side performing processing using the SRC region should satisfy the following conditions.

(a) A request for image conversion (an image conversion request) is first issued from the software.

(b) The control software included in the hardware performs conversion if the control software can start the conversion (if there are the SRC and DST regions available for the conversion) when the control software receives the image conversion request from the software.

(c) The control software is informed by the hardware of the completion of the conversion of an image to be converted in the SRC region. At this point, if the control software has received an image conversion request to be paired (with the image conversion completion) from the software (the image conversion request and the notification of the image conversion completion are a pair of opposite arrows between the software and the control software), the control software responds to the image conversion request, and if the control software has received the image conversion request, the control software responds to the image conversion request after the reception thereof.

(d) After receiving the response from the control software, the software executes a request included in the response, such as printing or transmission to the network. However, if there is no more image to be prepared, the software issues a request to receive the notification of conversion completion from the control software.

(e) The software receives a response from the printing or the transmission to the network. Thereafter, if the software has received a response from the control software, the software issues an image conversion request, and if the software has not received a response from the control software, the software issues an image conversion request after receiving the response.

(f) When the control software receives the notification of conversion completion from the hardware, the control software returns an image conversion completion response. In this case, the software always stores the converted image of the DST region.

As described above, parameters such as the SRC/DST transfer request between the software and the control software of the hardware use common status flags. The flags use a shared memory of UNIX®. On the software side, the flags can be both referred to and changed. On the control software side, however, the flags can only be referred to.

Since the software can both refer to and change the common status flags while the control software can only refer to the common status flags, the software receives the processing result of the control software as the return value of a response.

The response, however, is generated asynchronously with processing on the software side. Therefore, the software is prevented from performing processing unless the status of the software is WAIT. In this case, the software temporarily stores the contents of the processing, and when the software becomes able to prepare the processing, the software collates the contents with the common status flags and prepares for the next conversion (that is, supplies SRC and stores DST).

Thereafter, the software changes common status flags. If the results do not show that image conversion is completed, the software again requests image conversion.

The control software is prevented from directly reflecting its processing results in the common status flags. Therefore, the control software has local information so as to reflect its processing results in the common status flags. Further, when the control software receives a request for image conversion, the control software refers to the common status flags, and stores the common status flags therein.

When the control software completes processing, the control software compares the local information with the information stored therein at the time of receiving the request for image conversion, thereby determining whether it is possible to perform the next image conversion. If the next image conversion is performable, the control software performs the next image conversion.

A description is given, based on those described above, of the contents of the operations of FIG. 22. In step S301, the software 202 transmits a request for image conversion of SRC1 to the control hardware 220. In step S302, the control hardware requests the hardware 203 to start conversion of SRC1. In step S303, the hardware 203 notifies the control hardware 220 of the completion of the conversion of SRC1. In step S304, the control hardware 220 notifies the software 202 of the completion of the image conversion of SRC1. In step S305, the software notifies the input source/output destination 201 of the completion of the processing (conversion) of SRC1. In response to this notifications in step S308, the input source/output destination 201 notifies the software 202 of the completion of processing of SRC1.

Meanwhile, in step S306, the control hardware 220 requests the hardware 203 to start conversion of SRC2. In step S307, the hardware 203 notifies the control hardware 220 of the completion of the conversion of SRC2.

Next, in step S309, the software 202 transmits a request for image conversion of SRC2 to the control hardware 220. In step S310, the control hardware 220 notifies the software 202 of the completion of the image conversion of SRC2. In step S311, the software 202 notifies the input source/output destination 201 of the completion of the processing (conversion) of SRC2. In step S312, the control hardware 220 requests the hardware 203 to start conversion of SRC1. In step S313, the hardware notifies the control hardware 220 of the completion of the conversion of SRC1.

In step S314, the input source/output destination 201 notifies the software 202 of the completion of processing of SRC2. In step S315, the software 202 transmits a request for image conversion of SRC1 to the control hardware 220. In step S316, the control hardware 220 notifies the software 202 of the completion of the image conversion of SRC1. In step S317, the software 202 notifies the input source/output destination 201 of the completion of the processing (conversion) of SRC1.

In step S318, the control hardware 220 requests the hardware 203 to start conversion of SRC2. In step S319, the input source/output destination 201 notifies the software 202 of the completion of processing of SRC1. In step S320, the software 202 transmits a request for image conversion of SRC2 to the control hardware 220. In step S321, the hardware 203 notifies the control hardware 220 of the completion of the conversion of SRC2. In step S322, the control hardware 220 notifies the software 202 of the completion of the image conversion of SRC2. In step S323, the control hardware 220 requests the hardware to start conversion of SRC1. In step S324, the software 202 transmits a request for image conversion to the control hardware 220.

In step S325, the hardware 203 notifies the control hardware 220 of the completion of image conversion. In step S326, the control hardware 220 notifies the software 202 of the completion of the image conversion. In step S327, the software 202 notifies the input source/output destination 201 of processing of DST. In step S328, the input source/output destination 201 notifies the software 202 of the completion of the processing of DST. In step S329, the software 202 transmits a request to complete image conversion to the control hardware 220. In step S330, the control hardware 220 transmits an image conversion completion response to the software 202.

Figure 23:
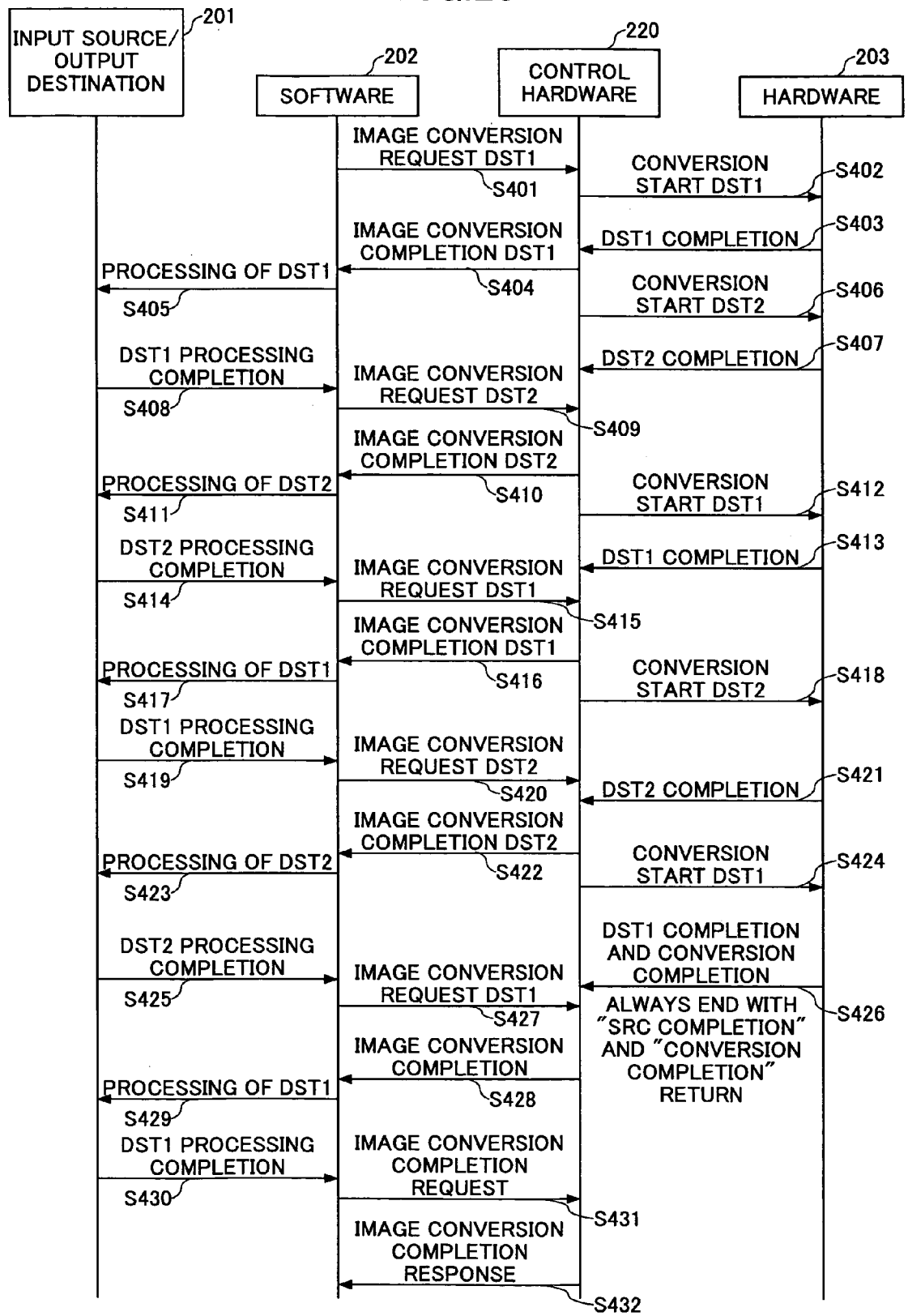
FIG. 23 is a timing chart showing operation timing in the case where the DST region is divided and the entire SRC image data is in the SRC region according to the embodiment of the present invention.

Next, a description is given, with reference to FIG. 23 of an I/F in the case where the DST region is divided and the entire SRC image data is in the SRC region.

In step S401, the software 202 transmits a request for image conversion of DST1 to the control hardware 220. In step S402, the control hardware 220 requests the hardware 203 to start conversion of DST 1. In step S403, the hardware 203 notifies the control hardware 220 of the completion of the conversion of DST1. In step S404, the control hardware 220 notifies the software 202 of the completion of the image conversion of DST1. In step S405, the software 202 notifies the input source/output destination 201 of the processing of DST1. That is, the software 202 notifies the input source/output destination 201 that the image conversion of DST1 is completed.

In step S406, the control hardware 220 requests the hardware 203 to start conversion of DST2. In step S407, the hardware 203 notifies the control hardware 220 of the completion of the image conversion of DST2.

In step S408, the input source/output destination 201 notifies the software 202 of the completion of processing of DST1. In step S409, the software 202 transmits a request for image conversion of DST2 to the control hardware 220. In step S410, the control hardware 220 notifies the software 202 of the completion of the image conversion of DST2. In step S411, the software 202 notifies the input source/output destination 201 of the processing of DST2. In step S412, the control hardware 220 requests the hardware 203 to start conversion of DST1. In step S413, the hardware 203 notifies the control hardware 220 of the completion of the conversion of DST1.

In step S414, the input source/output destination 201 notifies the software 202 of the completion of processing of DST2. In step S415, the software 202 transmits a request for image conversion of DST1 to the control hardware 220. In step S416, the control hardware 220 notifies the software 202 of the completion of the image conversion of DST1. In step S417, the software 202 notifies the input source/output destination 201 of the processing of DST1. In step S418, the control hardware 220 requests the hardware 203 to start conversion of DST2.

In step S419, the input source/output destination 201 notifies the software 202 of the completion of processing of DST1. In step S420, the software 202 transmits a request for image conversion of DST2 to the control hardware 220. In step S421, the hardware 203 notifies the control hardware 220 of the completion of the conversion of DST2. In step S422, the control hardware 220 notifies the software 202 of the completion of the image conversion of DST2. In step S423, the software 202 notifies the input source/output destination 201 of the processing of DST2. In step S424, the control hardware 220 requests the hardware 203 to start image conversion of DST1. In step S425, the input source/output destination 201 notifies the software 202 of the completion of processing of DST2. In step S426, the hardware 203 notifies the control hardware 220 of the completion of the conversion of DST1 and the completion of image conversion. In step S427, the software 202 transmits a request to image conversion of DST1 to the control hardware 220.

In step S428, the control hardware 220 notifies the software 202 of the completion of the image conversion. In step S429, the software 202 notifies the input source/output destination 201 of the processing of DST1. In step S430, the input source/output destination 201 notifies the software 202 of the completion of processing of DST1. In step S431, the software 202 transmits an image conversion completion request to the control hardware 220. In step S432, the control hardware 220 transmits an image conversion completion response to the software 202.

Figure 24:
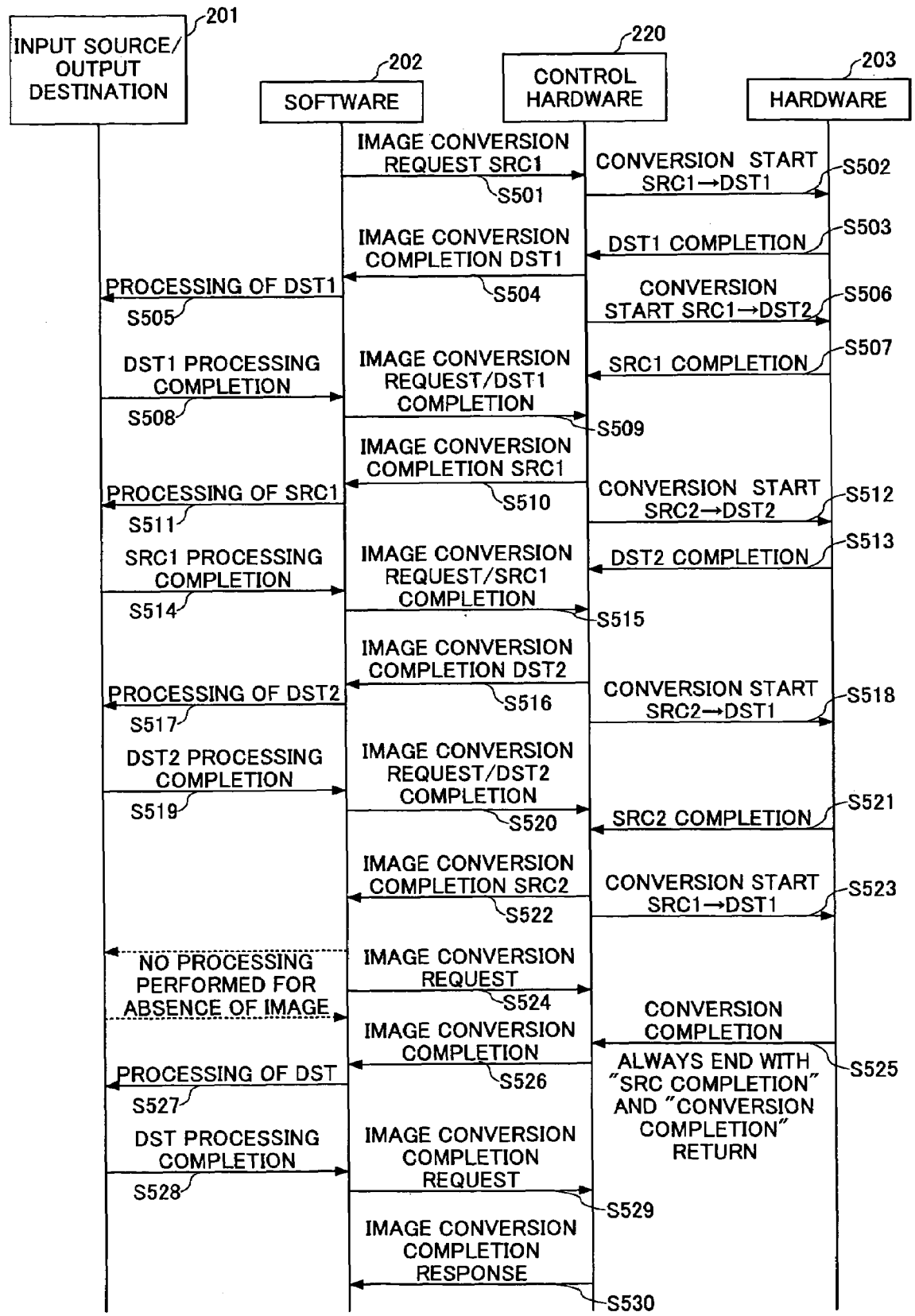
FIG. 24 is a timing chart showing the operation timing of the operation of dividing the SRC and DST regions according to the embodiment of the present invention.

FIG. 24 is a diagram for illustrating an I/F in the operation of dividing the SRC and DST regions. In step S501, the software 202 transmits a request for image conversion of SRC1 to the control hardware 220. In step S502, the control hardware 220 requests the hardware 203 to start conversion of SRC1 to DST1. In step S503, the hardware 203 notifies the control hardware 220 of the completion of DST1. In step S504, the control hardware 220 notifies the software 202 of the completion of the image conversion of SRC1 to DST1. In step S505, the software 202 notifies the input source/output destination 201 of the processing of DST1 (the conversion of SRC1 to DST1).

In step S506, the control hardware 220 requests the hardware 203 to start conversion of SRC1 to DST2. In step S507, the hardware 203 notifies the control hardware 220 of the completion of SRC1. In step S508, the input source/output destination 201 notifies the software 202 of the completion of processing of DST1. In step S509, the software 202 transmits a request for image conversion to the control hardware 220, and notifies the control hardware 220 of the completion of DST1. In step S510, the control hardware 220 notifies the software 202 of the completion of the image conversion of SRC1. In step S511, the software 202 notifies the input source/output destination 201 of the processing of DST2.

In step S512, the control hardware 220 requests the hardware 203 to start conversion of SRC2 to DST2. In step S513, the hardware 203 notifies the control hardware 220 of the completion of DST2.

In step S514, the input source/output destination 201 notifies the software 202 of the completion of processing of SRC1. In step S515, the software 202 transmits a request for image conversion to the control hardware 202, and notifies the control hardware 202 of the completion of SRC1. In step S516, the control hardware 220 notifies the software 202 of the completion of the image conversion of DST2. In step S517, the software 202 notifies the input source/output destination 201 of the processing of DST2. In step S518, the control hardware 220 requests the hardware 203 to start conversion of SRC2 to DST1.

In step S519, the input source/output destination 201 notifies the software 202 of the completion of processing of DST2. In step S520, the software 202 transmits a request for image conversion to the control hardware 220, and notifies the control hardware 220 of the completion of DST2. In step S521, the hardware 203 notifies the control hardware 220 of the completion of SRC2. In step S522, the control hardware 220 notifies the software 202 of the completion of the image conversion of SRC2. In step S523, the control hardware 220 requests the hardware 203 to start conversion of SRC1 to DST1. In step S524, the software 202 transmits a request for image conversion to the control hardware 220. In step S525, the hardware 203 notifies the control hardware 220 of the completion of image conversion. In step S526, the control hardware notifies the software 202 of the completion of the image conversion. In step S527, the software 202 notifies the input source/output destination 201 of processing of DST.

In step S528, the input source/output destination 201 notifies the software 202 of the completion of the processing of DST. In step S529, the software 202 transmits an image conversion completion request to the control hardware 220. In step S530, the control hardware 220 transmits an image conversion completion response to the software 202.

Thus, in the case of preparing input image data and converting output image data, a region where operation is performable is searched out so that the operation is performed effectively, thereby making it possible to perform high-speed processing and make effective use of resources.

If memory is not divided by software, image conversion is started after the reading of image data into an input image region is completed.

According to the above-described embodiment, input image data is convertible in units of sub SRC regions, and the converted image data is outputtable in units of sub DST regions. Accordingly, in the case of inputting image data to be converted, converting image data to be output, and outputting image data from a storage part, a region where each operation is performable is searched out so that subsequent image data can be prepared in the region other than the SRC and DST regions used for conversion. Therefore, it is possible to perform operations effectively, thus making it possible to perform high-speed processing, make effective use of resources, improve data transfer rate, and secure productivity according to data compression rate and processing rate in an MLB.

As a result, for instance, even if a plurality of different applications are caused to generate respective image requests by image output parts having different data formats, but it is impossible to store all of image data of the image formats of the different applications in a storage device, it is possible to perform image conversion in accordance with the data formats of the image output parts with efficiency.

Further, using a period for transferring image data from a first storage part to a second storage part, the transfer of image data inversely from the second storage part to the first storage part and the conversion and storage of the inversely transferred image data are performable simultaneously. This makes it possible to improve data transfer efficiency and storage use efficiency and suitably maintain the productivity of the image processing apparatus.

Further, for instance, image data can be shared on a network by connecting the image processing apparatus and external apparatuses via the network. Even if the external apparatuses have respective image output parts of different data formats, image data according to the data formats of the image output parts can be obtained.

The present invention is not limited to the specifically disclosed embodiment, and variations and modifications may be made without departing from the scope of the present invention.

The present application is based on Japanese priority patent applications No. 2002-374373, filed on Dec. 25, 2002, and No. 2003-419119, filed on Dec. 17, 2003, the entire contents of which are hereby incorporated by reference.

What is claimed is:

1. An image processing apparatus, comprising:
   an image input part inputting image data;
   an image storage part capable of storing the input image data;
   an image output part outputting the image data stored in said image storage part;
   a data format conversion part performing conversion on the image data output by said image output part so that a data format of the image data is converted to a data format suitable for said image output part;
   an SRC region reservation part reserving an SRC region of a capacity in said image storage part, the SRC region storing the image data to be subjected to the conversion by said data format conversion part;
   a DST region reservation part reserving a DST region in said image storage part, the DST region storing the image data of the capacity after the conversion;
   a region division part dividing at least one of the SRC and DST regions into a plurality of regions;
   a first storing part storing the input image data in the SRC region; and
   a second storing part storing the image data after the conversion in the DST region.

2. The image processing apparatus as claimed in claim 1, further comprising:
   an additional storage part capable of storing the image data stored in said image storage part;
   a transfer part transferring the image data after the conversion to said additional storage part;
   a transfer reception region reserving part reserving a transfer reception region equal in capacity to the transferred image data in said additional storage part;
   a transfer storage part storing the input image data in the transfer reception region reserved by said transfer reception region reserving part; and
   an inverse transfer part transferring the image data stored in said additional storage part to said image storage part.

3. The image processing apparatus as claimed in claim 2, further comprising a block table,
   wherein the image data is stored in units of blocks of a fixed-length size into which said additional storage part is divided; and
   said block table shows whether the blocks are used to store the image data.

4. The image processing apparatus as claimed in claim 3, further comprising a descriptor table including information on a starting block of one or more of the blocks obtained contiguously to store the image data and information on the number of contiguous blocks.

5. The image processing apparatus as claimed in claim 4, further comprising an image ID table correlating an image ID assigned uniquely to the image data with said descriptor table.

6. The image processing apparatus as claimed in claim 1, further comprising an access control part performing access control between the image processing apparatus and an external apparatus, wherein said data format conversion part performs the conversion on the image data in accordance with a conversion command issued from the external apparatus and received by the access control performed by said access control part; and said access control part outputs the image data after the conversion to the external apparatus.

7. An image processing method, comprising the steps of:
(a) performing conversion on image data output from an image storage part by an image output part so that a data format of the image data is converted to a data format suitable for the image output part, the image data being input by an image input part and stored in the image storage part;
(b) reserving an SRC region of a capacity in the image storage part, the SRC region storing the image data to be subjected to the conversion by said step (a);
(c) reserving a DST region in the image storage part, the DST region storing the image data of the capacity after the conversion;
(d) dividing at least one of the SRC and DST regions into a plurality of regions;
(e) storing the input image data in the SRC region; and
(f) storing the image data after the conversion in the DST region.

8. The image processing method as claimed in claim 7, further comprising the steps of:
(g) transferring the image data after the conversion to an additional storage part;
(h) reserving a transfer reception region equal in capacity to the transferred image data in the additional storage part;
(i) storing the input image data in the reserved transfer reception region;
(j) transferring the image data stored in the additional storage part to the image storage part;
(k) obtaining the SRC region in which the image data transferred from the additional storage part is storable; and
(l) storing the image data transferred from the additional storage part in the SRC region obtained by said step (k).

9. The image processing method as claimed in claim 7, further comprising the step of (g) performing access control between an image processing apparatus and an external apparatus, wherein said step (a) performs the conversion on the image data in accordance with a conversion command issued from the external apparatus and received by the access control performed by said step (g); and said step (g) outputs the image data after the conversion to the external apparatus.

10. A computer-readable recording medium storing a program for causing a computer to execute an image processing method, the computer including an image input part inputting image data, an image storage part capable of storing the input image data, and an image output part outputting the image data stored in the image storage part, the image processing method comprising the steps of:
(a) performing conversion on the image data output by the image output part so that a data format of the image data is converted to a data format suitable for the image output part;
(b) reserving an SRC region of a capacity in the image storage part, the SRC region storing the image data to be subjected to the conversion by said step (a);
(c) reserving a DST region in the image storage part, the DST region storing the image data of the capacity after the conversion;
(d) dividing at least one of the SRC and DST regions into a plurality of regions;
(e) storing the input image data in the SRC region; and
(f) storing the image data after the conversion in the DST region.

* * * * *